United States Patent
Raffle et al.

(10) Patent No.: US 10,890,941 B2
(45) Date of Patent: Jan. 12, 2021

(54) AUGMENTED AND/OR VIRTUAL REALITY HEADSET

(71) Applicant: GOOGLE INC., Mountain View, CA (US)

(72) Inventors: Hayes S. Raffle, Palo Alto, CA (US); Andrew Nartker, San Francisco, CA (US); Sandeep Waraich, Mountain View, CA (US); Phan Thao Benno Dang, San Francisco, CA (US); Gerald Kirk McGinty, Jr., Santa Cruz, CA (US); Albert Lee, San Francisco, CA (US); Byeong Seon Oh, San Francisco, CA (US); Dan Odell, Palo Alto, CA (US); Eric Allan MacIntosh, Mountain View, CA (US); Erik Hubert Dolly Goossens, San Francisco, CA (US); Michael Simonian, San Francisco, CA (US); Maaike Evers, San Francisco, CA (US); Xinda Hu, Sunnyvale, CA (US); Xiaohui Tao, Los Altos, CA (US); Ronghui Zhu, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 472 days.

(21) Appl. No.: 15/720,026

(22) Filed: Sep. 29, 2017

(65) Prior Publication Data

US 2018/0095498 A1  Apr. 5, 2018

Related U.S. Application Data

(60) Provisional application No. 62/403,689, filed on Oct. 3, 2016.

(51) Int. Cl.
*G02B 27/02* (2006.01)
*G06F 1/16* (2006.01)
(Continued)

(52) U.S. Cl.
CPC ............. *G06F 1/163* (2013.01); *G02B 7/026* (2013.01); *G02B 27/0176* (2013.01);
(Continued)

(58) Field of Classification Search
CPC .......... G06F 1/1613; G06F 1/16; G06F 1/163; G06F 1/1656; G06F 1/1622;
(Continued)

(56) References Cited

U.S. PATENT DOCUMENTS

2015/0155917 A1* 6/2015 Won ..................... H04B 1/3888
                                                    455/41.1
2015/0253574 A1* 9/2015 Thurber ............. G02B 27/0172
                                                    359/630

(Continued)

FOREIGN PATENT DOCUMENTS

CN     204462542 U    7/2015
EP     2993577 A1    3/2016
(Continued)

OTHER PUBLICATIONS

Lon Seidman, DodoCase Google Cardboard VR toolkit Review (https://www.youtube.com/watch?v=vGWO-vDnJLY, published Aug. 15, 2014) (Year: 2014).*

(Continued)

*Primary Examiner* — Stephone B Allen
*Assistant Examiner* — Jyotsna V Dabbi
(74) *Attorney, Agent, or Firm* — Brake Hughes Bellermann LLP

(57) ABSTRACT

A headset for experiencing an augmented and/or a virtual reality environment may include a housing defining an interior cavity, with optical components received in the interior cavity of the housing. A front face may be rotatably coupled to a front portion of the housing to selectively enclose the interior of the housing. A computing device (Continued)

including a display may be received in a slot defined between the front portion of the housing and the front face. A face pad may be removably coupled to the housing, opposite the front face, so as to enclose the optical components in the housing. A user may view an augmented/virtual reality environment displayed on the display through the optical components received in the housing. An adjustable head strap assembly may adjustably position the headset on the head of the user.

18 Claims, 22 Drawing Sheets

(51) Int. Cl.
    *G02B 27/01*     (2006.01)
    *G02B 7/02*     (2006.01)
    *G06K 7/10*     (2006.01)
    *G06K 19/07*     (2006.01)

(52) U.S. Cl.
    CPC ....... *G06F 1/1656* (2013.01); *G06K 7/10297* (2013.01); *G06K 19/0723* (2013.01)

(58) Field of Classification Search
    CPC ....... G06F 1/1681–1684; G06F 1/1675; G06F 1/1698; G06F 3/012; G06F 3/011; G06K 7/10297; G06K 19/0723; G02B 7/00; G02B 7/02; G02B 7/026; G02B 27/01; G02B 27/017; G02B 27/0176; G02B 27/22; G02B 2027/078; G03B 35/24
    USPC .......................................................... 359/480
    See application file for complete search history.

(56) References Cited

U.S. PATENT DOCUMENTS

| 2015/0303993 A1 | 10/2015 | Showering |
| 2016/0011422 A1 | 1/2016 | Thurber et al. |
| 2016/0224176 A1 | 8/2016 | Kim et al. |

FOREIGN PATENT DOCUMENTS

| KR | 20160093249 A | 8/2016 |
| KR | 20160094114 A | 8/2016 |
| WO | 2015137165 A1 | 9/2015 |
| WO | 2016085394 A1 | 6/2016 |

OTHER PUBLICATIONS

International Search Report and Written Opinion for PCT Application PCT/US2017/054658, dated Jan. 12, 2018, 17 pages.

\* cited by examiner

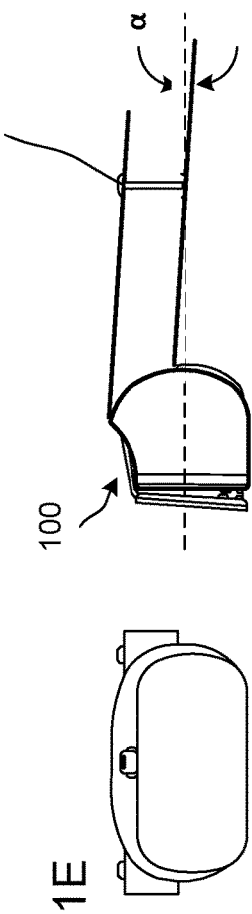
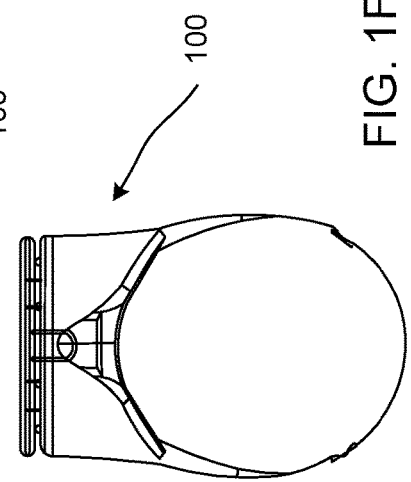
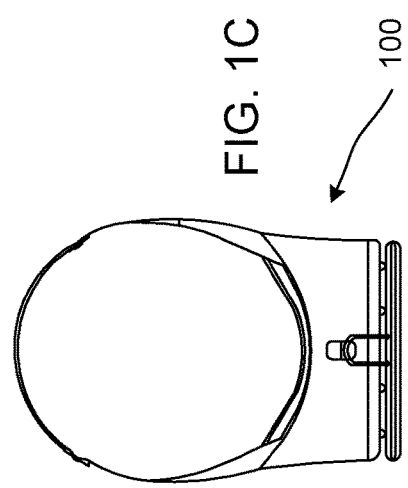
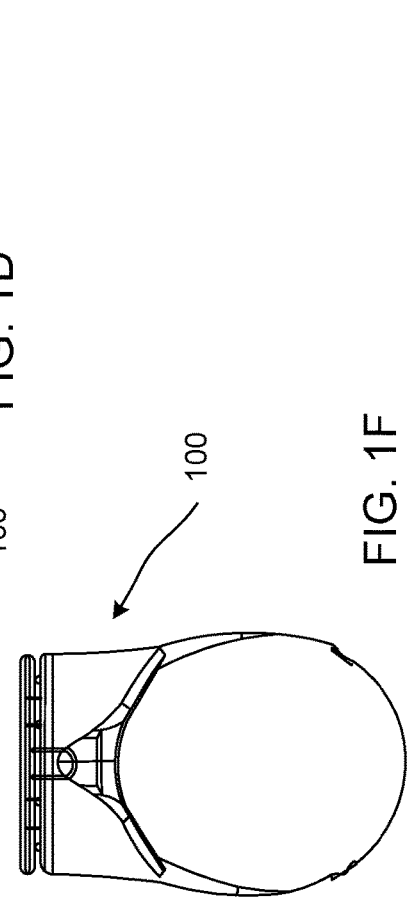
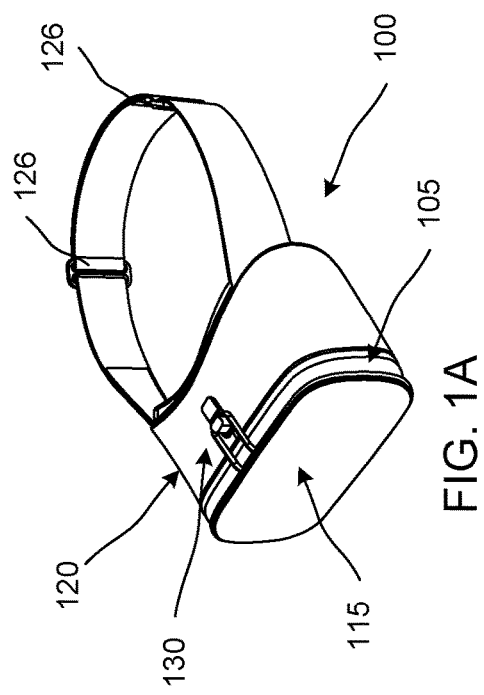
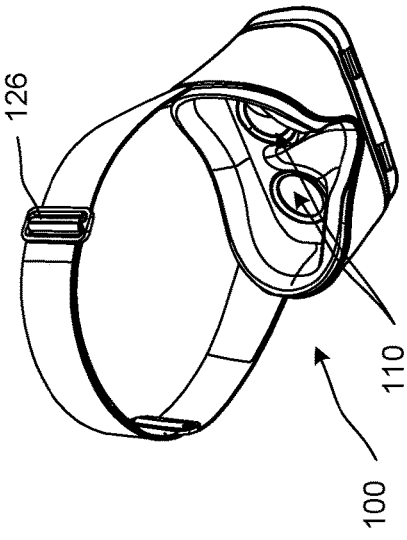

AUGMENTED AND/OR VIRTUAL REALITY HEADSET

CROSS REFERENCE TO RELATED APPLICATION

This application is a Non-Provisional of, and claims priority to, U.S. Provisional Application No. 62/403,689, filed on Oct. 3, 2016, the disclosure of which is incorporated by reference herein in its entirety.

TECHNICAL FIELD

This document relates, generally, to an augmented and/or a virtual reality headset.

BACKGROUND

An augmented reality (AR) system and/or a virtual reality (VR) system may generate a three-dimensional (3D) immersive augmented and/or virtual reality environment. A user may experience this virtual environment through interaction with various electronic devices. For example, a helmet or other head mounted device including a display, glasses or goggles that a user looks through, either when viewing a display device or when viewing the ambient environment, may provide audio and visual elements of the immersive environment to be experienced by a user. A user may move through and interact with elements in the virtual environment through, for example, hand/arm gestures, manipulation of external devices operably coupled to the head mounted device, such as for example a handheld controller, gloves fitted with sensors, and other such electronic devices.

BRIEF DESCRIPTION OF THE DRAWINGS

FIGS. 1A-1F illustrate various views of an example augmented and/or virtual reality headset, in accordance with implementations described herein. In particular, FIG. 1A is a front perspective view, FIG. 1B is a rear perspective view, FIG. 1C is top plan view, FIG. 1D is a side view, FIG. 1E is a front view, and FIG. 1F is a bottom plan view, of an example augmented and/or virtual reality headset, in accordance with implementations described herein.

DETAILED DESCRIPTION

Figure 2A:
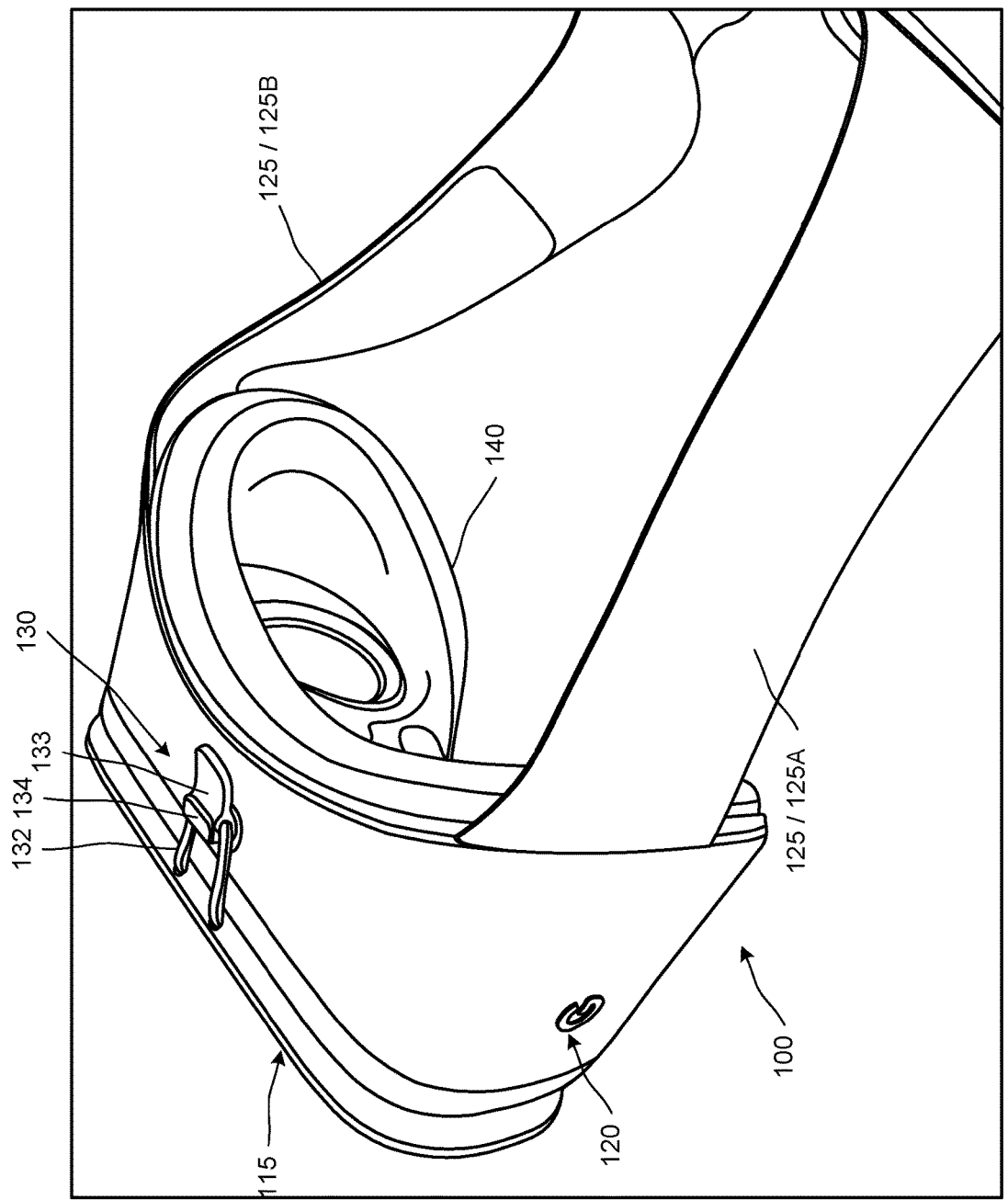
FIGS. 2A-2C illustrate various views of an example augmented and/or virtual reality headset, in accordance with implementations described herein.
Figure 2B:
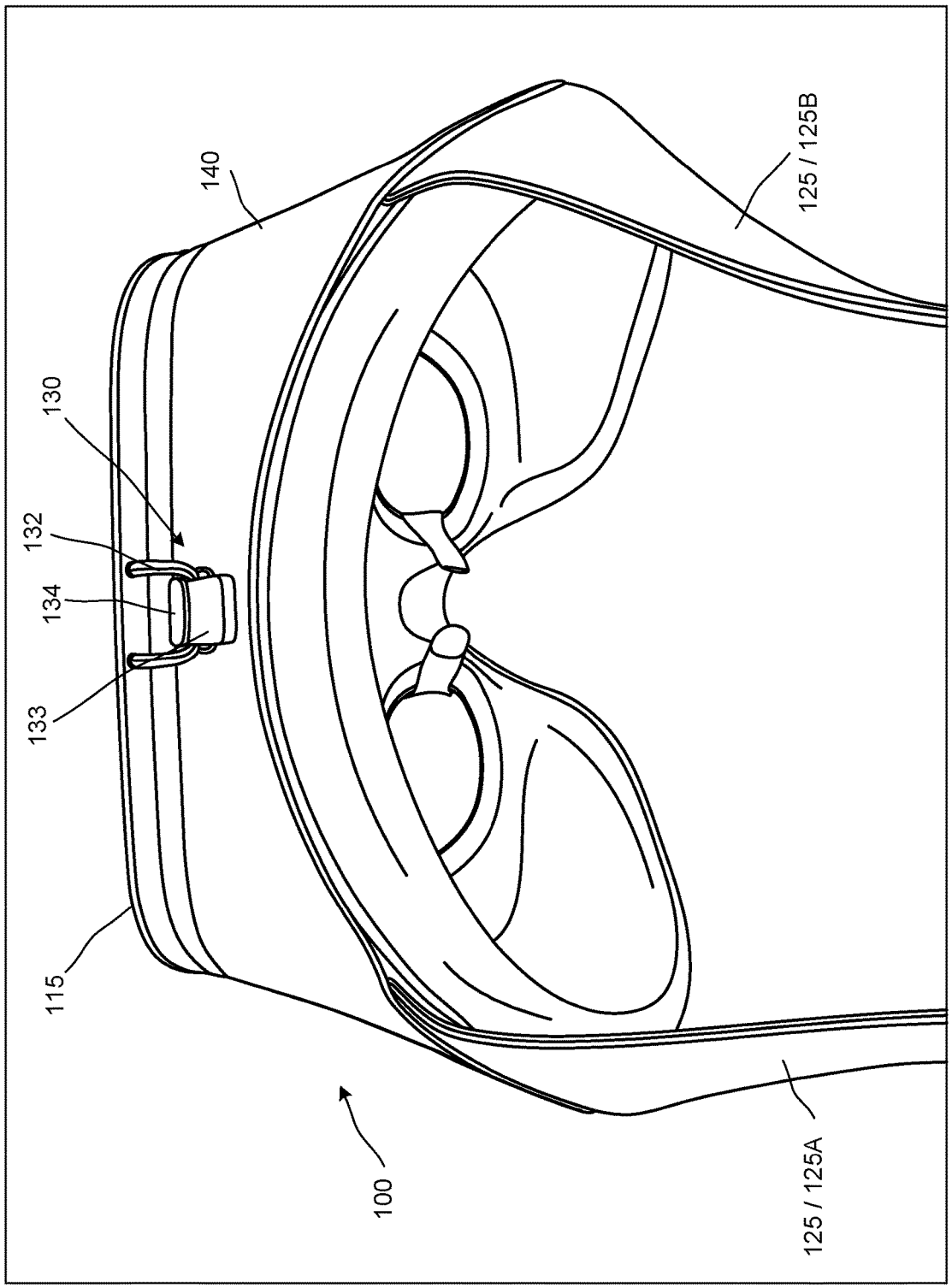
Figure 2C:
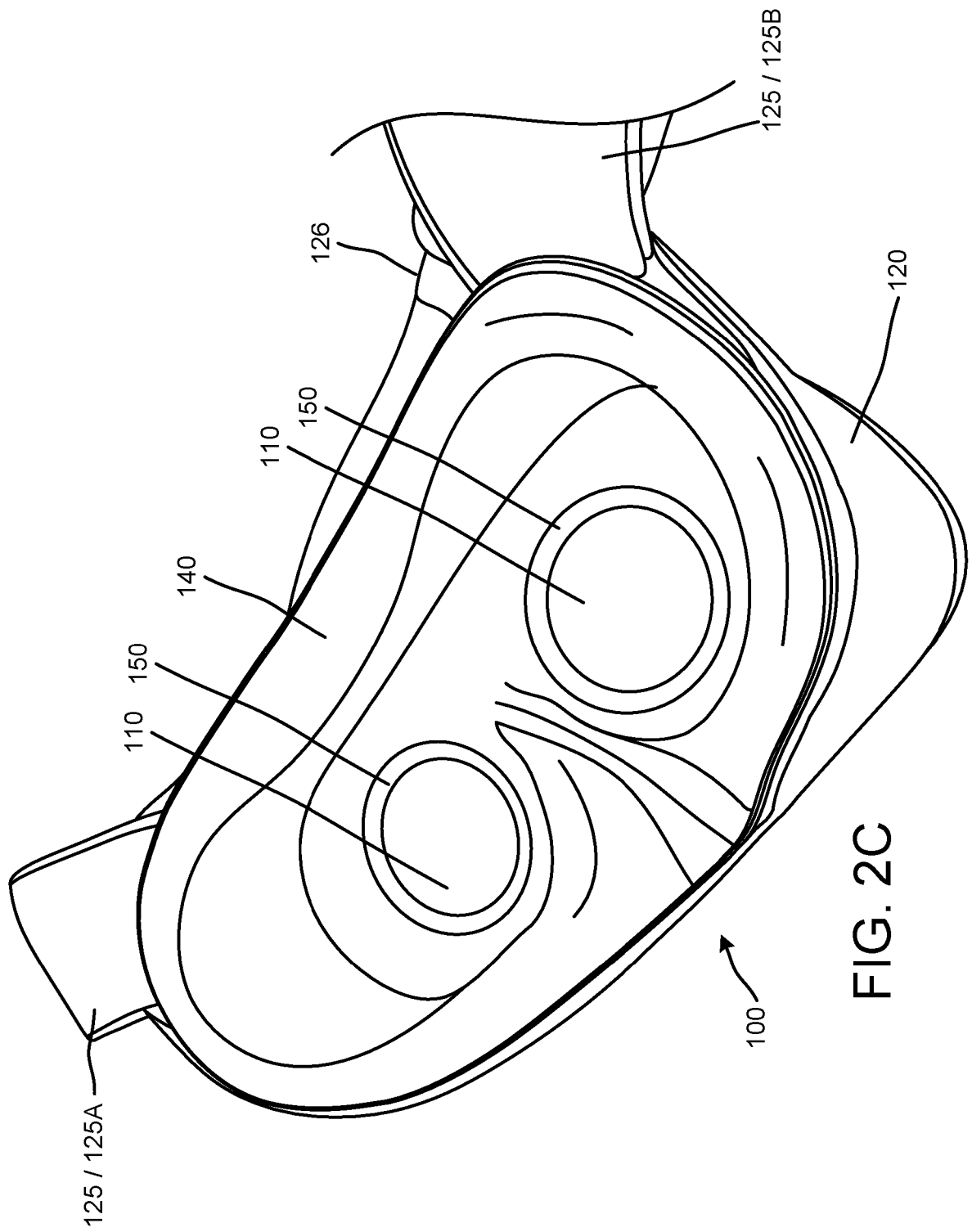

FIGS. 1A through 1F are diagrams that illustrate various views of a and augmented and/or virtual reality head mounted display (HMD) device 100, or headset 100, which may provide an augmented and/or a virtual reality environment to a user. In particular, FIG. 1A is a front perspective view, FIG. 1B is a rear perspective view, FIG. 1C is top plan view, FIG. 1D is a side view, FIG. 1E is a front view, and FIG. 1F is a bottom plan view, of the example headset 100. FIGS. 2A-2C illustrate various closer in views of the example headset 100 shown in FIGS. 1A-1F. In particular, FIGS. 2A-2B are top views of the example headset 100, and FIG. 2C illustrates an interior portion of the example headset 100.

As shown in, for example FIGS. 1A and 2A, a device, for example, a computing device such as a mobile phone (not shown in detail) can be inserted into an opening 105, or a slot 105, formed in the headset 100. The slot 105 may be positioned between a housing portion 120 and a front face portion 115 of the headset 100. In some implementations, the front face 115 may be rotatably coupled to the housing 120 (see, for example, FIG. 4A). In some implementations, the front face 115 may be rotated away from the housing 120, so that the computing device may be positioned in the slot 105. The front face 115 may then be rotated back toward the housing 120 and held in position relative to the housing 120 by, for example, a fastening device 130 engaged between the front face 115 and the housing 120. Images displayed on a display of the computing device positioned in the slot 105 and received in the headset 100 in this manner can be viewed via optical lenses 110 positioned in the housing 120. A microphone and/or a speaker of the computing device may be accessible and/or exposed when the computing device is received in the slot 105, so that audio signals may be received by the microphone of the computing device received in the headset 100, and audio signals may be output by the speaker of the computing device received in the headset 100. In some implementations, an audio port of the computing device received in the slot 105 may be exposed, or accessible from an exterior of the headset 100, so that an audio output device (such as, for example, ear buds, headphones, or other types of speakers) may be connected to the computing device.

As shown in more detail in FIGS. 2A and 2B, in some implementations, the fastening device 130 may include, for example, a strap 132 provided on one of the front face 115 or the housing 120, and a protrusion 133 provided on the other of the front face 115 or the housing 120. In some implementations, the strap 132 may be flexible, and may include a tab 133. The tab 133 may facilitate engagement of the strap 132 with the protrusion 134 to secure the position of the front face 115 relative to the housing 120, and disengagement of the strap 132 from the protrusion 134 to allow movement of the front face 115 away from the housing 120.

As shown in more detail in FIGS. 2A-2C, an adjustable head strap assembly may be coupled to the housing 120 to adjustably position the headset 100 on the head of the user. The adjustable head strap assembly may include a head strap 125 having a first portion coupled to a first upper lateral side portion of the housing 120, and a second portion coupled to a second upper lateral side portion of the housing 120. In some implementations, the attachment of the head strap 125 relative to the housing 120 of the headset 100 (for example, the position and/or orientation of the head strap 125 relative to the housing 120) may allow the headset 100 to be ergonomically positioned on the head of the user. For example, the positioning and/or orientation of the head strap 125 relative to the housing 120 may allow the headset 100 to be ergonomically positioned on the head, or face, of the user, providing a more comfortable, immersive user experience. For example, the positioning and/or orientation of the head strap 125 relative to the housing 120 may cause the weight of the headset 100 to be distributed so that relatively more of the weight of the headset 120 is borne on the forehead of the user, with relatively less pressure/weight resting on the nose and/or cheeks of the user. This may provide a more comfortable fit of the headset 100 on the face of the user. In some implementations, the positioning and/or orientation of the head strap 125 relative to the housing 120 may facilitate the proper alignment of the eyes of the user with a pair of optical lenses 110 installed in the housing 120.

In some implementations, the positioning and/or orientation of the head strap 125 relative to the housing 120 may be characterized by, for example, an angle α of a centerline of the head strap 125 relative to a centerline of the housing 120, as shown in FIG. 1D. For example, in some implementations, the angle α may be less than approximately 10 degrees. In some implementations, the angle α may be between approximately 5 and 10 degrees. In some implementations, the angle α may be approximately 7 degrees. As shown in, for example, FIGS. 1A, 1B, 1D, 2A and 2B, a first end of the first portion 125A of the head strap 125 may be attached to a first upper lateral side portion of the housing 120, and a first end of the second portion 125B of the head strap 125 may be attached to a second upper lateral side portion of the housing 120. For example, in some implementations, the head strap 125 may be attached at an upper half to upper third of the opposite lateral sides of the housing 120, and the attachment of the head strap 125 to the housing 120 may extend up into a top side portion of the housing 120, as shown in, for example, FIGS. 1B and 2B. This angle α of the head strap 125 relative to the housing 120, and attachment of the head strap 125 at the upper portion of the housing 120, may help to maintain the proper orientation of the headset 100 on the face of the user. This angle α of the head strap 125 relative to the housing 120, and attachment of the head strap 125 at the upper portion of the housing 120, may cause relatively more weight to be borne by the forehead of the user, with relatively less force applied to the nose and/or cheeks of the user.

Figure 3A:
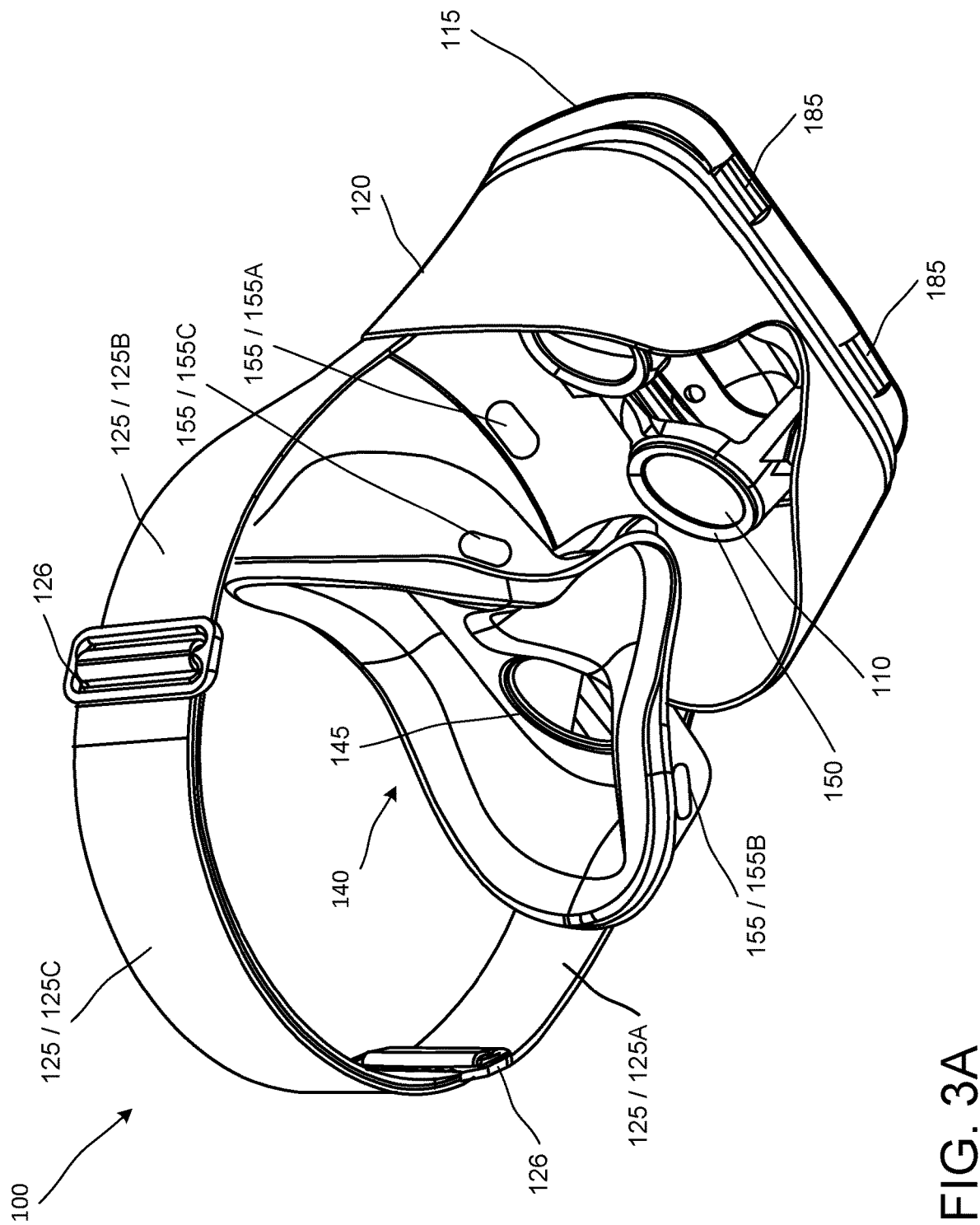
FIGS. 3A-3J illustrate features of a removable face pad of an example augmented and/or virtual reality headset, in accordance with implementations described herein.
Figure 3B:
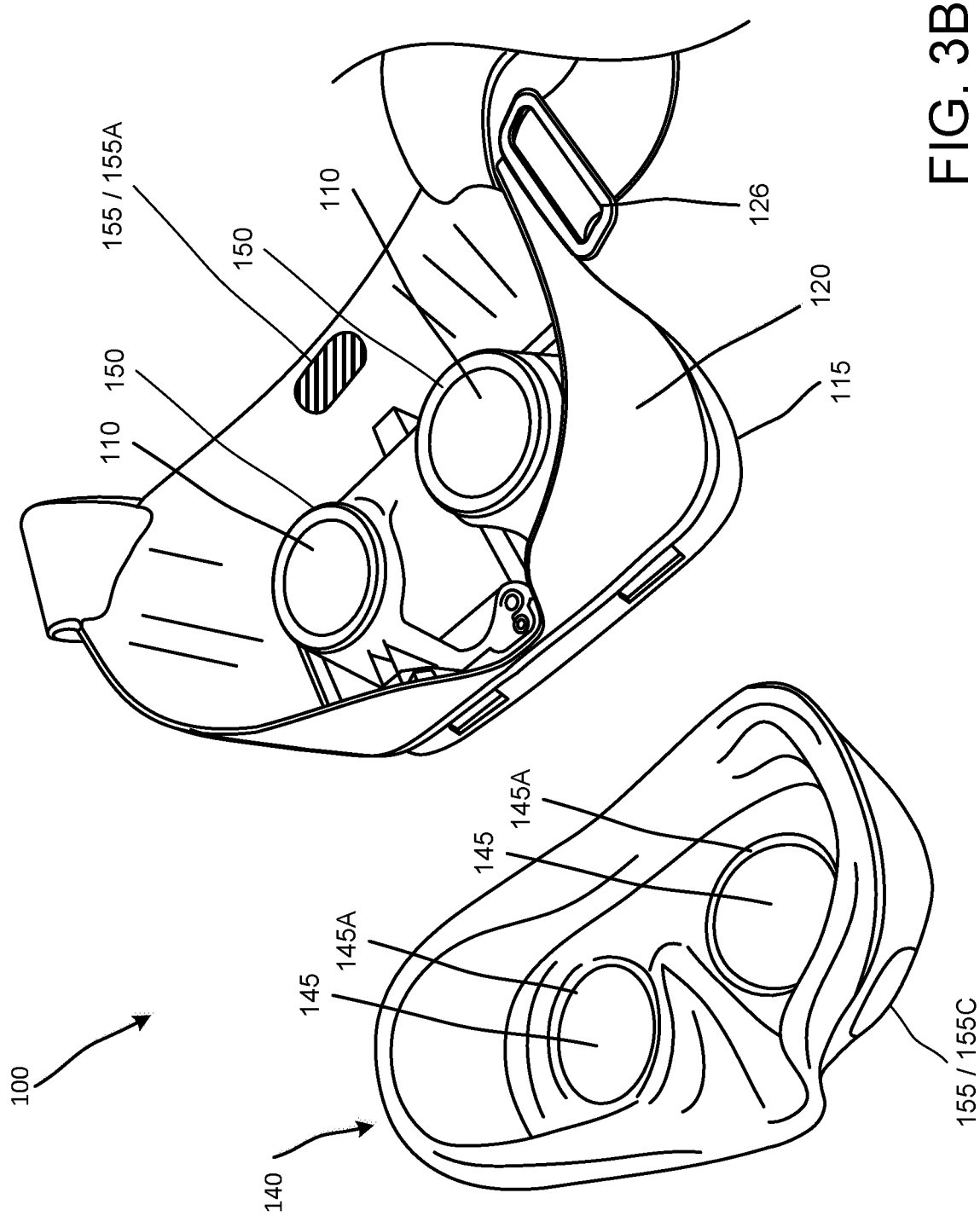
Figure 3C:
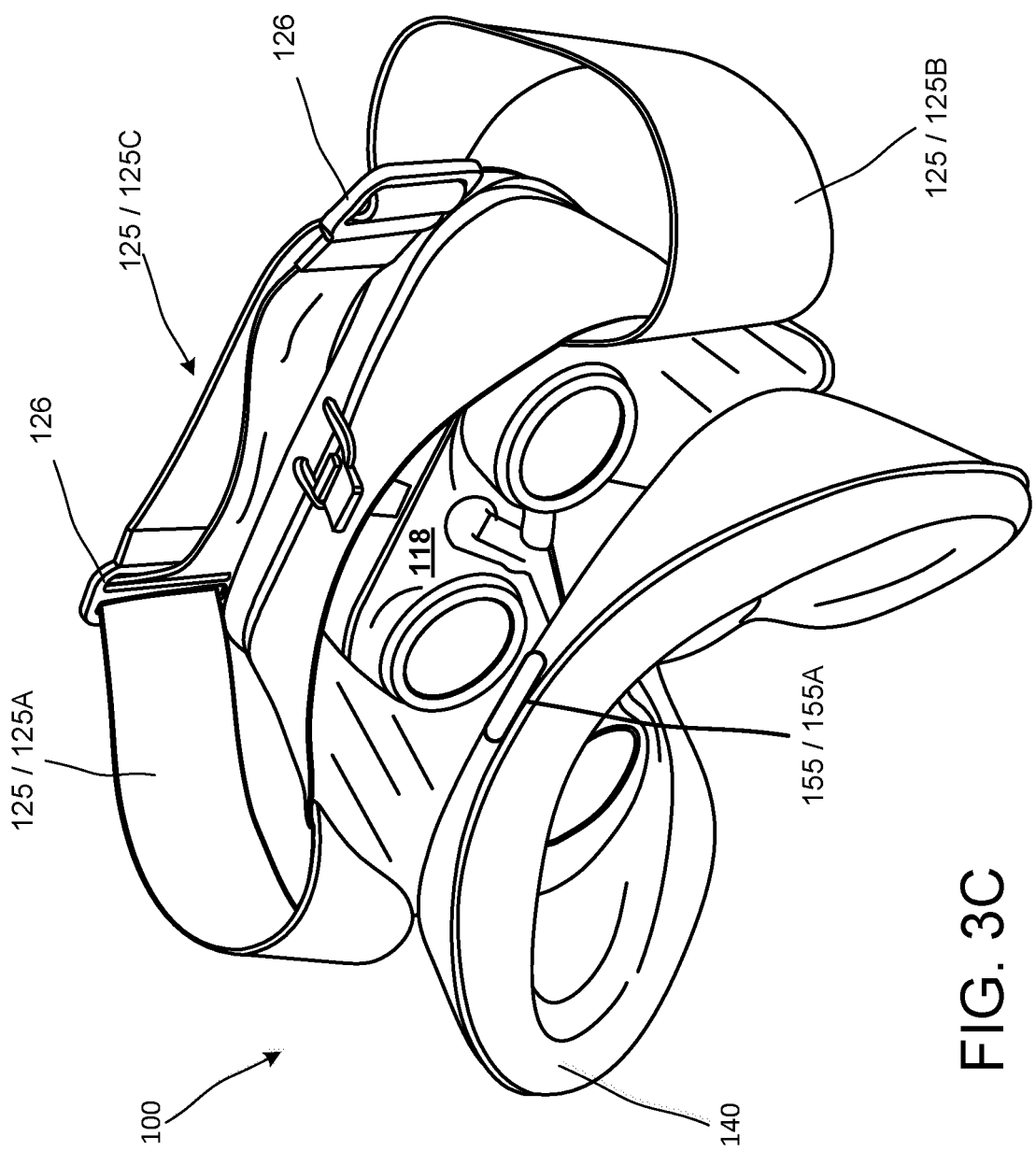

In some implementations, one or more adjustment mechanisms 126 may be coupled on the head strap 125. The one or more adjustment mechanisms 126 may allow for adjustment of a length of the head strap 125 based on, for example, a size and/or a contour of a head of the user. In some implementations, the one or more adjustment mechanisms 126 may be, for example, over-under type clips, which provide for adjustment of an overlap portion 125C of the first and second end portions 125A, 125B of the head strap 125 (see, for example, FIGS. 3C, 4A and 4B). For example, a second end of the first portion 125A of the head strap 125 may be fixedly coupled to a first of the two clips 126, while the second portion 125B of the head strap 125 may be movably coupled to the first of the two clips 126. Similarly, a second end of the second portion 125B of the head strap 125 may be fixedly coupled to a second of the two clips 126, while the first portion 125AB of the head strap 125 may be movably coupled to the second of the two clips 126. This may allow an overall length of the head strap 125 to be adjusted as the clips 126 slide along the first and second portions 125A, 125B of the head strap 125, to help secure a proper position of the headset 100 on the head of the user, and a proper position of the optical elements (for example, the optical lenses 110) of the headset 100 relative to the eyes of the user. In some implementations, the head strap 125 may be made of a somewhat flexible material, allowing the head strap 125 to conform to the shape of the head of the user. The head strap 125 may be relatively inelastic, or have little to no elasticity. This lack of elasticity, or stretch. may help to stabilize a position of the headset 100, and keep the headset 100 from moving, once the user has secured the headset 100 in place and adjusted the fit of the head strap 125 by movement of the clips 126. For example, the head strap 125 may be made of a woven, or braided, or webbed fabric, that is flexible, allowing the head strap 125 to conform to the shape of the head of the user, but is relatively inelastic, so that once the head strap 125 (for example, by adjustment of the clips 126), the headset 100 remains in place and does not shift.

In some implementations, the combination of the angle α of the attachment of the head strap 125 to the housing 120, the attachment of the head strap 125 to an upper portion of the housing 120, the placement of the one or more clips 126 on the head strap 125, and the flexible, relatively inelastic material of the head strap 125, may allow the headset 100 to be comfortably and properly positioned on the head of the user and oriented relative to the eyes of the user. These factors may also allow this proper positioning and orientation of the headset 100 to be maintained during use, and may enhance user comfort during use.

Figure 3D:
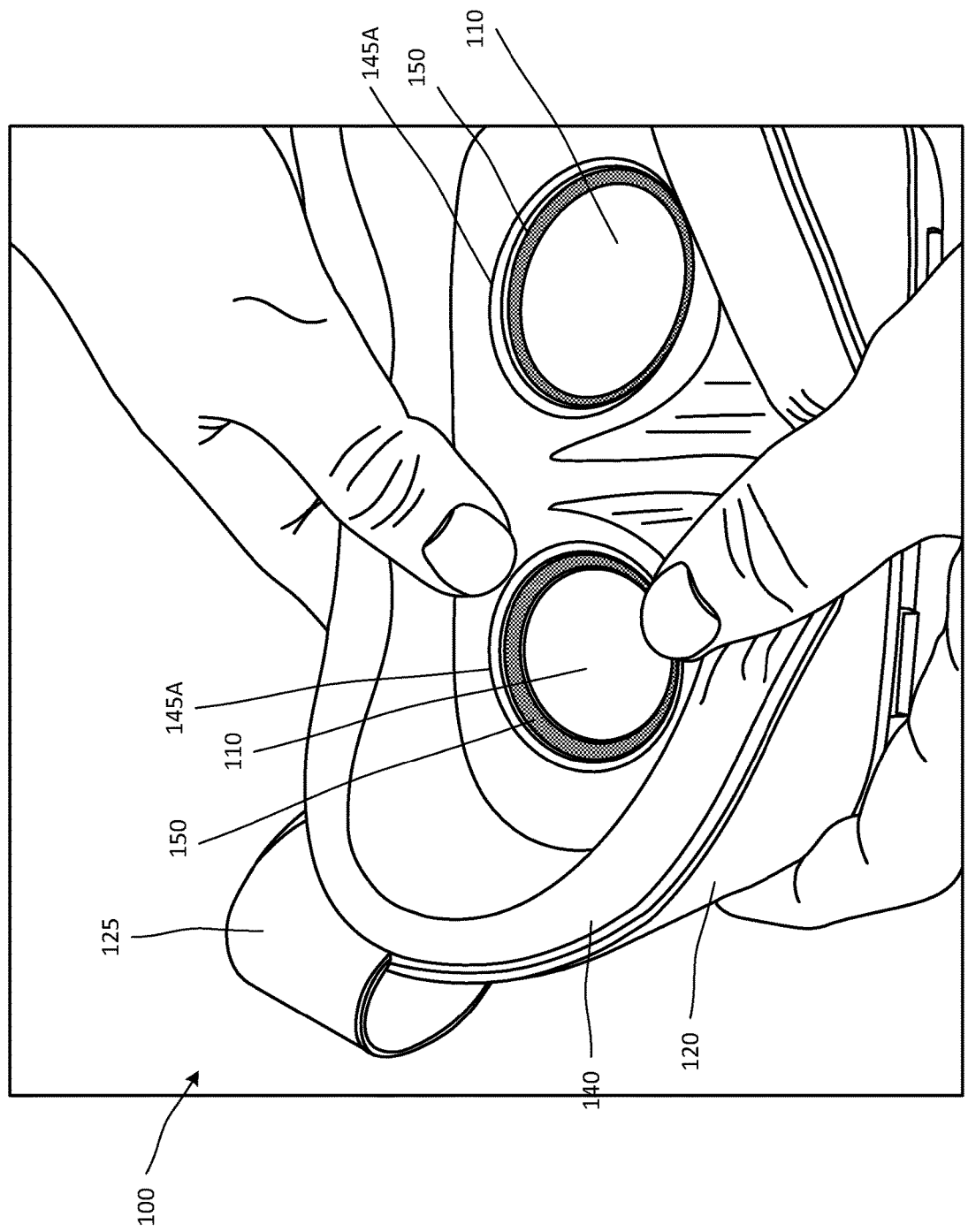
Figure 3E:
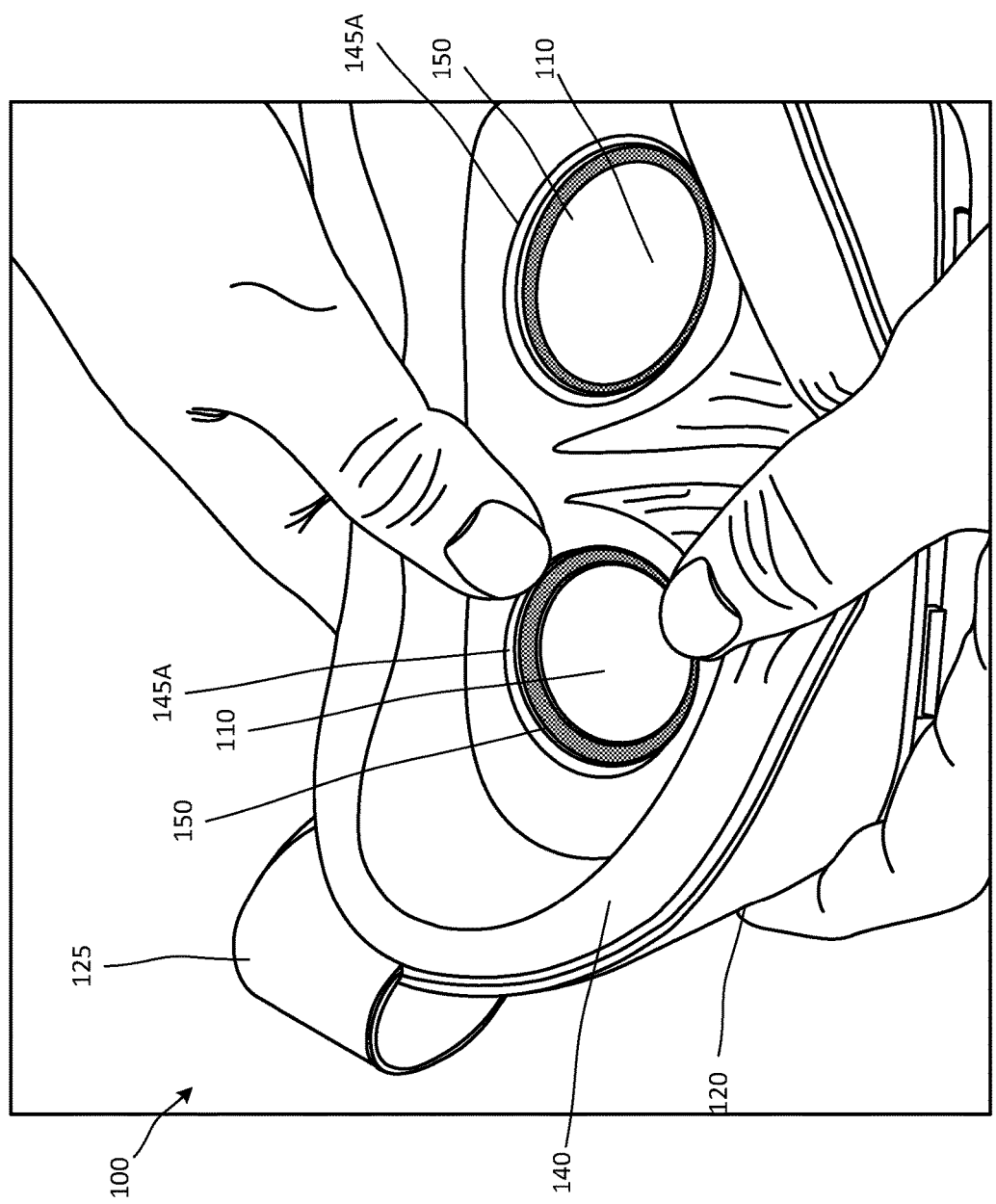
Figure 3F:
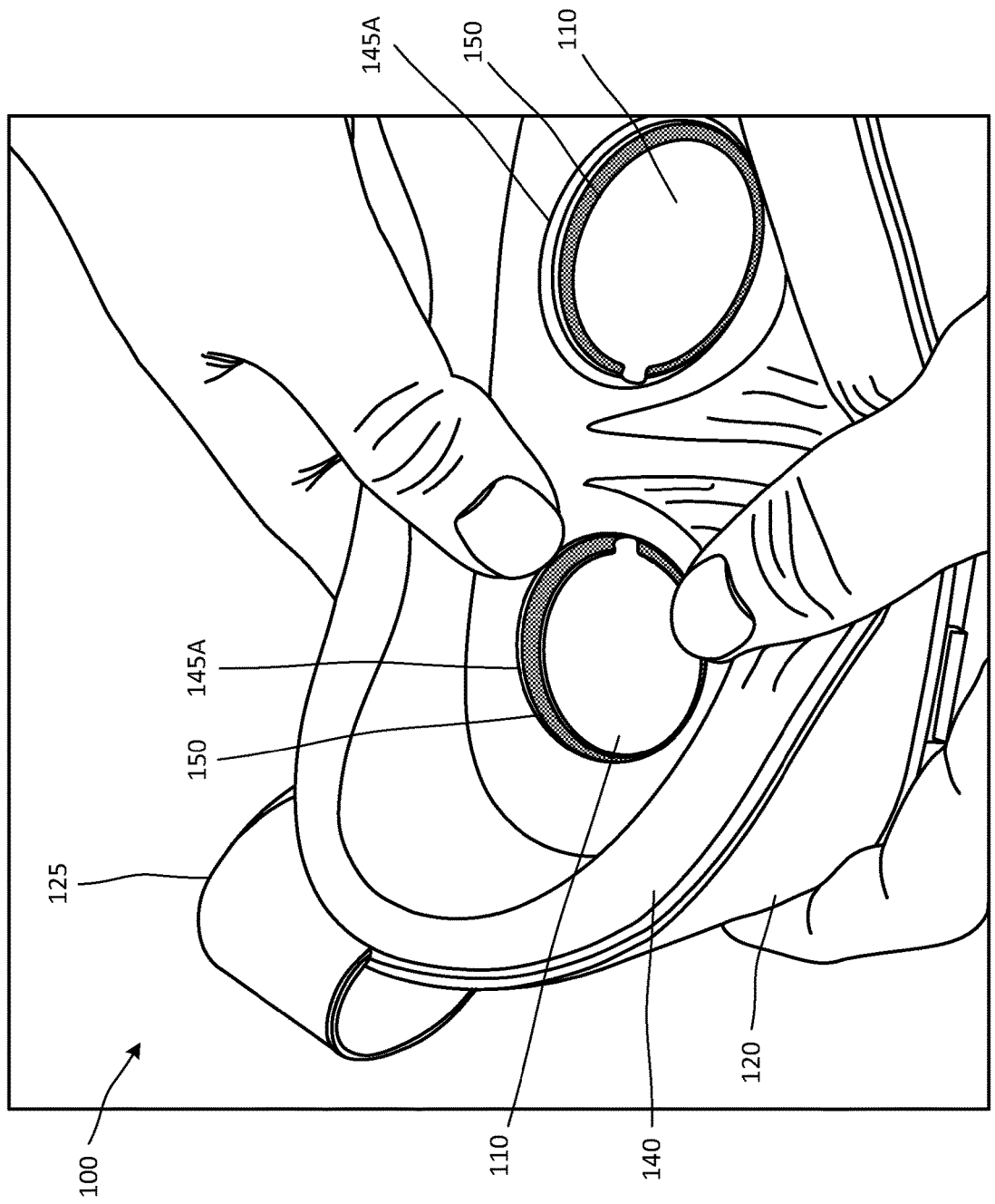
Figure 3G:
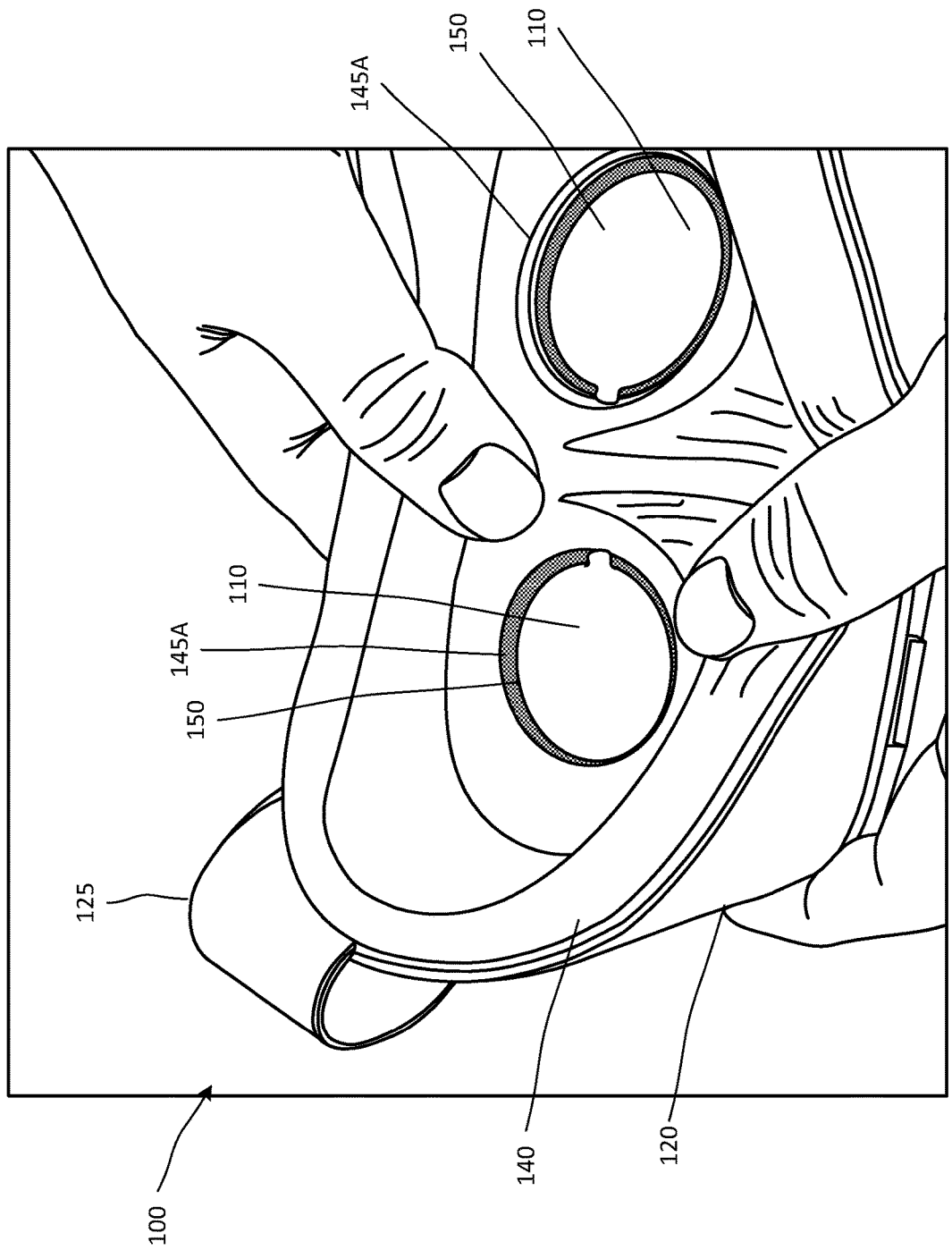
Figure 3H:
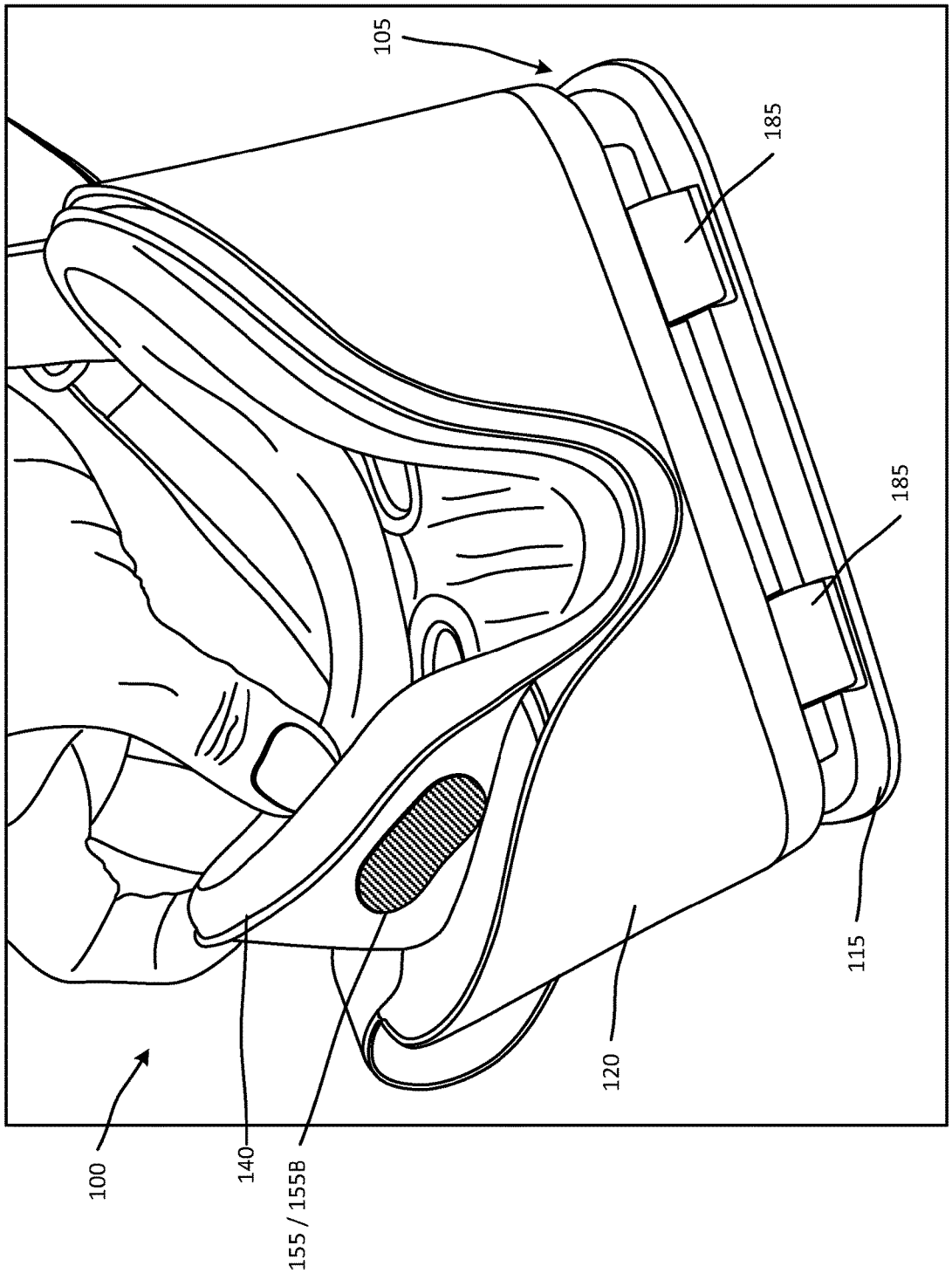
Figure 3I:
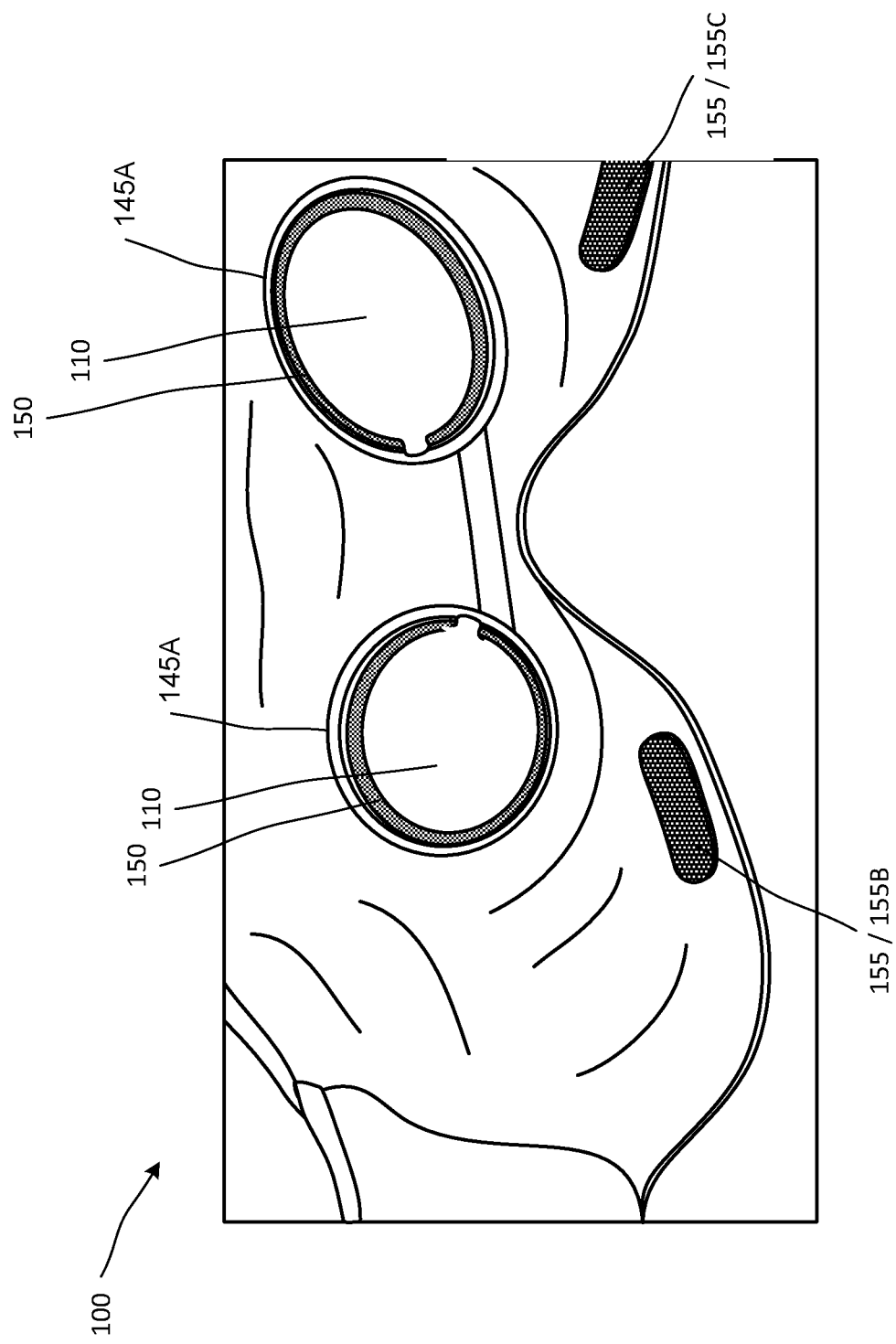
Figure 3J:
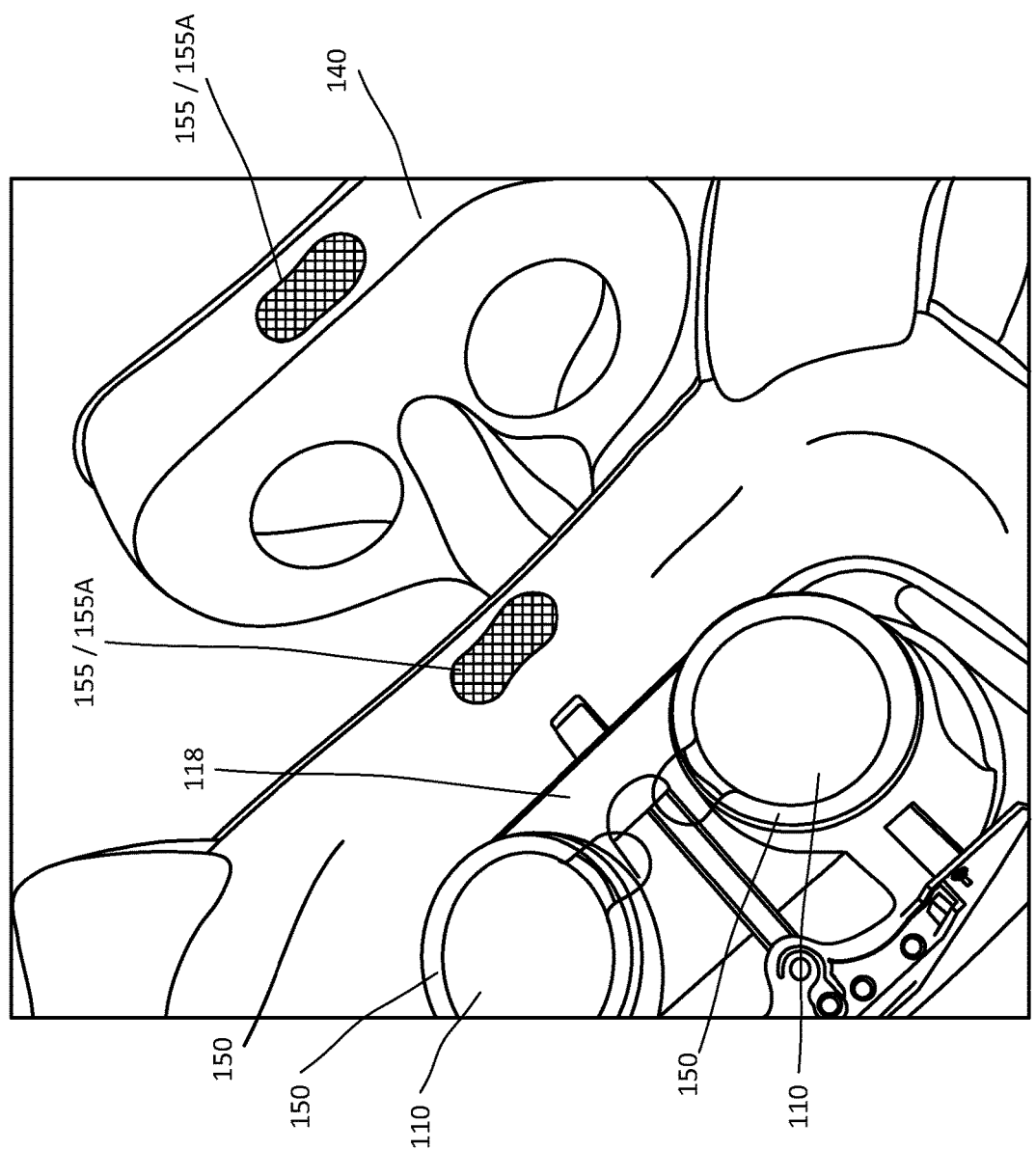

FIGS. 3A through 3J are various views illustrating a removable face pad 140 of the headset 100, including removal of the face pad 140 from the housing 120 of the headset 100, and replacement of the face pad 140 into the housing 120 of the headset 120. In particular, FIGS. 3A-3C, 3I and 3J illustrate the face pad 140 removed from, or decoupled from the housing 120 of the headset 100. FIGS. 3D through 3G illustrate coupling of the face pad 140 to the housing 120 of the headset 100. FIGS. 3H through 3J illustrate removal of the face pad 140 from the housing 120 of the headset 100. As shown in FIGS. 3A-3J, the removal and replacement of the face pad 140 includes removal and replacement of essentially the entire rearward facing, or user facing, side of the headset 100. The face pad 140 defines the interface of the headset 100 with the user, making direct contact with the user, and in particular the face of the user. Removal of essentially this entire rearward facing side of the headset 100 that makes direct contact with the user may render use of the headset 100 more hygienic, and may allow the headset/user interface to be tailored for specific users.

As shown in, for example, FIG. 3D, openings 145 defined in the face pad 140 may be aligned with the optical lenses 110 installed in the housing 120, and a peripheral edge portion 145A of each opening 145 of the face pad 140 can be inserted around a corresponding optical ring 150 surrounding a respective lens 110 of the headset 100, as shown in FIGS. 3E through 3G. In some implementations, each of the optical rings 150 may be relatively rigid, and the installation of the coupling of the optical ring 150 and the optical lens 110 may define a recessed portion in which the edge portion 145A of the respective opening 145 in the face pad 140 may be received and held in place relative to the optical lens 110.

In some implementations, the face pad 140 may be flexible (e.g., somewhat flexible), to allow the face pad 140 to be manually manipulated and positioned into place in the housing 120 relative to the optical lenses 110. The face pad 140 may have some amount of rigidity, so that the face pad 140 retains the intended form once coupled in the housing 120. For example, in some implementations, the face pad 140 may include a fabric cover over a flexible foam form to provide a measure of flexibility, and also rigidity, to the face pad 140. In some implementations, the peripheral edge portion 145A of each opening 145 may be treated, or coated to provide a cleanly finished edge along the peripheral edge portion 145 of the opening 145. This may prevent stray portions of the foam form and/or the fabric cover of the face pad 140 from extending into an area in front of the optical lens 150, and obscuring a view through the lens 150.

In some implementations, a coupling mechanism 155 may maintain a position of the face pad 140 coupled in the housing 120. For example, in some implementations, the coupling mechanism 155 may include one or more hook and loop fasteners, an adhesive between the face pad 140 and the housing 120, one or more clips, one or more hooks, and the like. In the example shown in FIGS. 3H-3J, a first hook and loop fastener 155A at a top portion of the headset 100, a second hook and loop fastener 155B at a first bottom side portion of the headset 100, and a third hook and loop fastener 155C at a second bottom side portion of the headset couple the face pad 140 in the housing 120, simply for ease of discussion and illustration. However, more, or fewer, sets of hook and loop fasteners 155, and/or other types of coupling mechanisms, may couple the face pad 140 in the housing 120. Each of the example sets of hook and loop fasteners 155 shown in FIGS. 3H-3J includes a first pad (i.e., one of a hook or loop pad) on the face pad 140, and a second pad (the other of the hook or loop pad) on a corresponding portion of the housing 120. Coupling of the face pad 140 in the housing 120 in this manner may provide for secure, but removable, coupling of the face pad 140 in the housing 120, while allowing for some adjustment of a position of the face pad 140 in the housing 120.

The coupling of the peripheral edge portions 145A of the openings 145 in the face pad 140 around the optical rings 150 as described above, together with the coupling of the face pad 140 in the housing 120 described above, may block ambient light from entering the interior of the headset 100. This may enhance the immersive virtual experience for the user. The ability to remove the face pad 140 from the housing 120, and replace the face pad 140 in the housing 120, may allow for cleaning of the interior of the face pad 140 and/or the housing 120. This may also allow a used/worn face pad 140 to be replaced with a new face pad 140, without having to replace the remainder of the headset 100. In this arrangement, face pads 140 having a variety of different sizes and/or shapes and/or contours may be coupled in the housing 120. This may allow users to customize the headset 100 for the shape of their face, to accommodate glasses, and the like, providing a better, more comfortable fit, and better blocking ambient light from entering the interior of the headset 100. This may also allow different users to install their personal face pad 140 in a common housing 120, making it more comfortable and hygienic for multiple users to use the same headset 100. The ability to remove and replace the face pad 140 in this manner may improve user comfort and convenience, and enhance the user experience.

As noted above, in some implementations, the face pad 140 may include a flexible foam form, defining the shape and/or contour of the face pad 140, and a fabric cover on one, or both, sides of the flexible foam form. Similarly, in some implementations, the housing 120 may include a flexible plastic form, or a flexible foam form, defining the shape and/or contour of the face pad 140, and a fabric cover on one, or both, sides of the flexible plastic/foam form. This may render the headset 100 relatively light weight yet with the necessary structural rigidity to support components within the housing 120. This may also allow for some flexibility in the headset 100, when the headset 100 is positioned against the face of the user and then the head strap 125 is tightened to properly position and secure the headset 100 in place against the face of the user. This may allow the headset 100 to be further adaptable to a variety of different users having differing facial contours and features, further improving user comfort and convenience, and further enhancing the user experience.

Figure 4A:
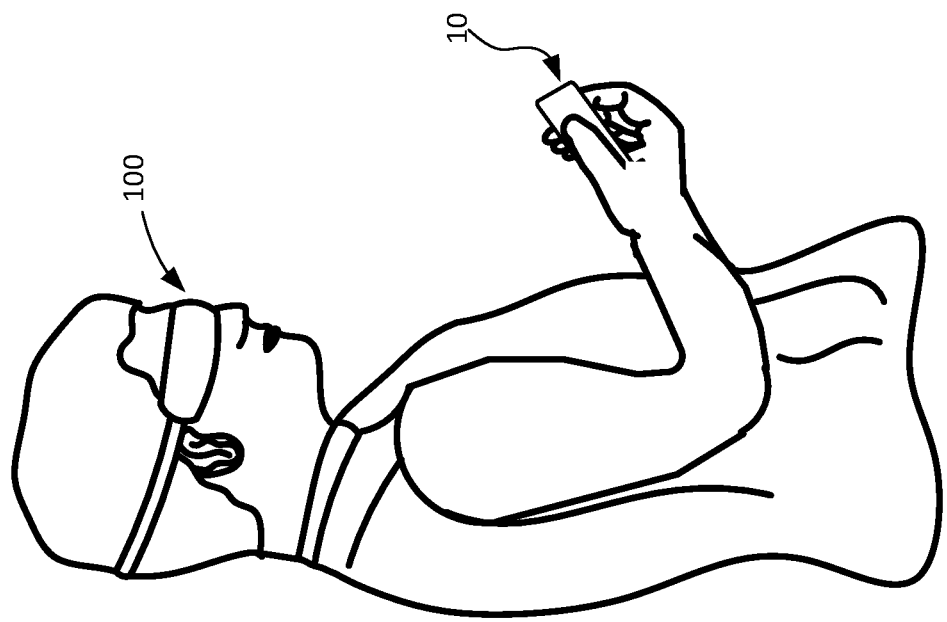
FIG. 4A illustrates a user wearing an example augmented and/or virtual reality headset.
Figure 4B:
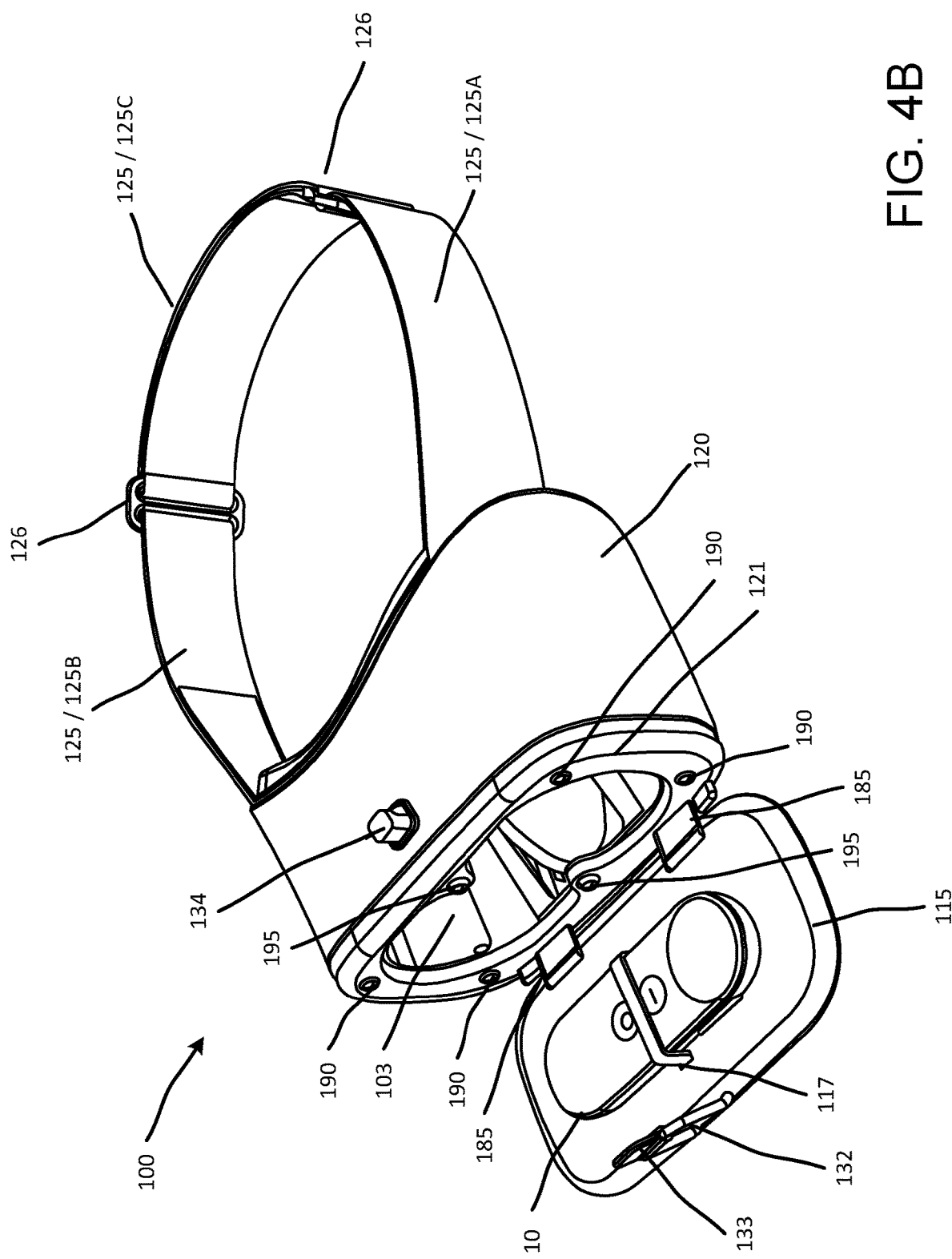
FIGS. 4B-4C illustrate an example augmented and/or virtual reality headset, with a front face portion rotated away from a main housing of the headset, in accordance with implementations described herein.
Figure 4C:
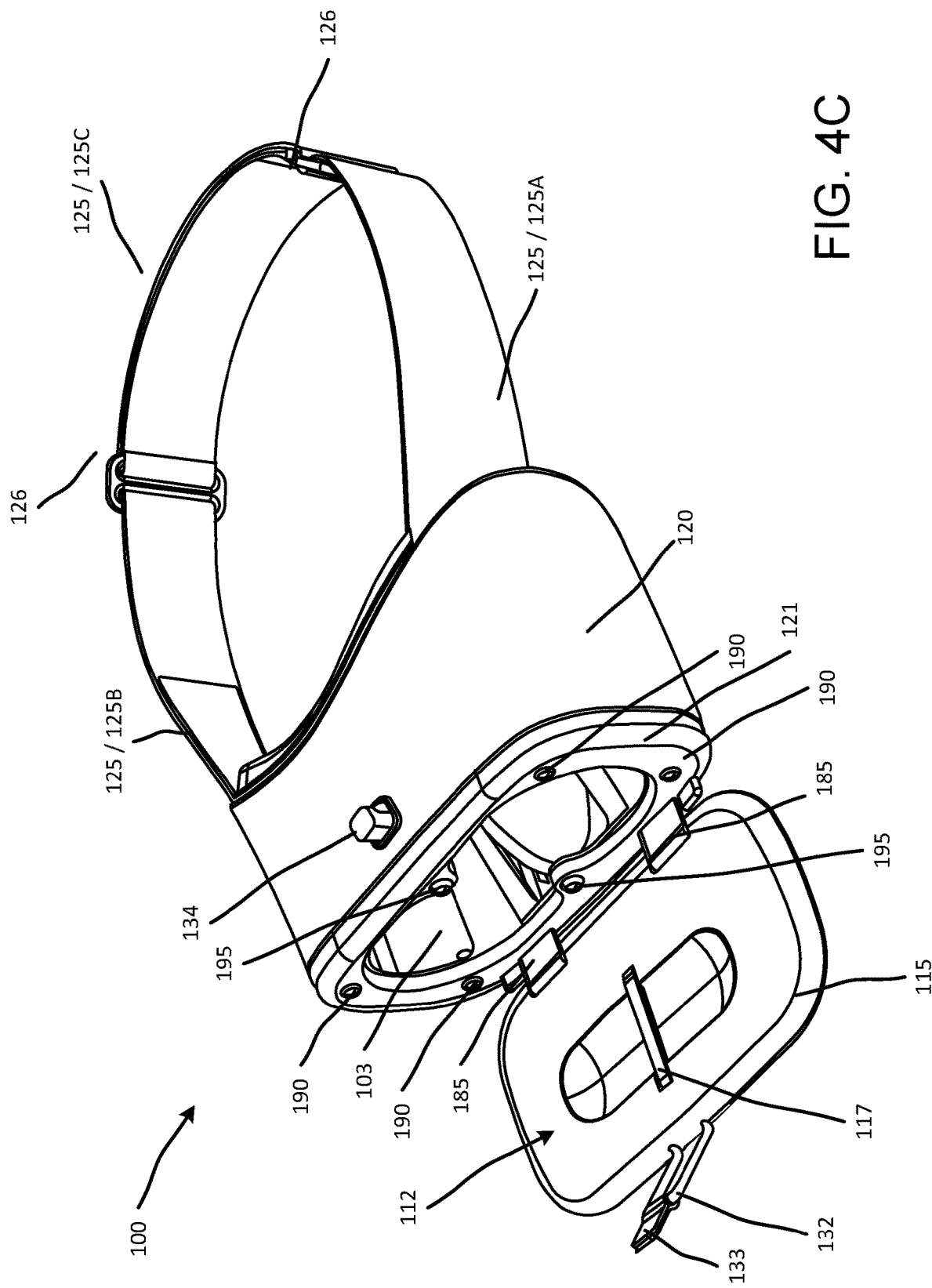

FIG. 4A illustrates a user wearing the headset 100, and holding a controller 10. The controller 10 may be paired with, or operably coupled with, and communicate with, a computing device generating the virtual environment to be experienced by the user wearing the headset 100. The computing device generating the virtual environment may be, for example, a computing device that is received in the slot 105 (described above with respect to FIGS. 1A-1F) between the front face 115 and the housing 120 of the headset 100. This pairing, or operable coupling, may provide for communication and exchange of data between the controller 10 and computing device, so that the controller 10 may facilitate interaction with and input into the virtual environment. FIGS. 4B and 4C are front perspective views of the headset 100, with the front face 115 rotated away from the housing 120, so that an interior of the housing 120, and an interior facing side of the front face 115, are visible.

In some implementations, a recess 112 may be defined in the front face 115 of the headset 100, as shown in FIG. 4C. The recess 112 may accommodate the controller 10, for example, for storage when the computing device is not received in the slot 105 and the controller 10 is not in use. When the front face 115 of the headset 100 is the closed position against the housing 120 (as in, for example, FIG. 2A), the controller 10 can be disposed in a cavity 103 within the housing 120 of the headset 100. In some implementations, a width and a length of the cavity 103 may be greater than a corresponding width and length of the controller 10, so that the controller 10 may be accommodated in the cavity 103. The cavity 103 may be defined by a space formed between the optical lenses 110 and an interior facing side of the front face 115, when the front face 115 is in a closed position against the housing 120. In some implementations, the controller 10 can be maintained in the recess 112 of the front face 115 by, for example, a coupling mechanism 117. In some implementations, the coupling mechanism 117 can be an elastic coupling mechanism, a clip, an adhesive, a hook and loop fastener, a screw, and the like. In some implementations, the controller 10 and/or the front face 115 can be configured so that the controller 10 can be press fit into the recess 112 of the front face 115. In the example illustrated in FIG. 4B, the controller 10 is coupled in the recess 112 by a single coupling mechanism 117 that is disposed across (orthogonal to) the recess 112 (which is aligned longitudinal across the front face 115). However, in some implementations, one or more coupling mechanisms 117 can be included in the front face 115 of the headset 100 to couple the controller 10 to the front face 115.

Hinge mechanisms 185 shown in FIGS. 4B and 4C may rotatably couple the front face 115 to the housing 120 of the headset 100. The hinge mechanisms 185 may be adjustable, so that devices of various thicknesses can be accommodated in the slot 105 (shown in FIG. 1A). For example, in some implementations, the hinge mechanisms 185 may include a spring loaded rail structure, so that a width of the slot 105, or a distance by which the hinge mechanism 185 is extended from the housing 120, may vary to accommodate devices of various thicknesses between the front face 115 and the housing 120 of the headset 100, with the front face 115 latched in place against the housing 120 by the fastening device 130. For example, in some implementations, this adjustment provided by the hinge mechanisms 185 may allow a computing device, such as, for example, a smartphone, including a protective casing, to be received and held in the slot 105.

As shown in FIGS. 4B and 4C, in some implementations, one or more support pads 190 may be provided on a front surface 121 of the housing 120. When the computing device is received in the slot 105, with the front face 115 fastened against the housing 120 by the fastening device 130, the support pads 190 may contact a corresponding surface of the computing device. The support pads 190 may be made of a material such as, for example, silicone, so that contact between the computing device and the support pads 190 provides resistance to movement of the computing device in the slot 105, without damaging the contact surface of the computing device. The support pads 190 may provide a further securing mechanism of the computing device in the slot 105, so that the computing device does not move within the slot 105, and so that the computing device is not unintentionally released from the slot 105. Four support pads 190 are provided at four corner portions of the front surface of the housing 120 shown in FIGS. 4B and 4C, simply for ease of discussion and illustration. However, more, or fewer, support pads 190 may be included on the front surface 121 of the housing 120, in varying arrangements.

In some implementations, electronic pads 195 may be included on the front surface 121 of the housing 120. As illustrated in the example shown in FIGS. 4B and 4C, one electronic pad 195 may be positioned at top central portion of the front surface 121 of the housing 120, and another electronic pad 195 may be positioned at a bottom central portion of the front surface 121 of the housing 120. The electronic pads 195 may be positioned opposite each other at the central portion of the front surface 121 of the housing 120, between the left and right optical lenses 110 received within the housing 120. When the computing device is secured in the slot 105 by the fastening device 130 and the support pads 190 as described above, the electronic pads 195 may be positioned against the display device of the computing device. For example, the electronic pads 195 may be positioned against respective top and bottom central portions of the display device, at a point between a left portion of the display and a right portion of the display. When the computing device, and the display, is energized, the electronic pads 195 may experience a slight load. The electronic pads 195 may convey this capacitance to the display, which the computing device may interpret as a central reference point for splitting the display device into the left portion of the display and the right portion of the display.

When operating in a virtual reality mode, the computing device may generate separate images to be displayed to each eye. When the user views these separate images through the left and right optical lenses 110, with the left and right eyes maintaining some separation, the user may resolve the left and right images respectively displayed on the left and right portions of the display device into a single image having the illusion of depth. Electronic referencing of the display device of the computing device in the slot 105 in the manner described above may allow the display device to be split into the right and left portions based on the actual positioning of the computing device in the slot 105, rather than a split between left and right portions of the display device which requires precise positioning of the computing device in the slot 105. Electronic referencing of the display device of the computing device in the slot 105 in the manner described above may also allow the display device to be re-referenced in response to slight movement of the computing device in the slot 105. This real time referencing, or re-referencing, may reduce or substantially eliminate blurring and the like of the images as viewed by the user due to mis-alignment of the computing device in the slot 105, and/or movement of the computing device in the slot 105, thus reducing motion sickness and the like.

Figure 5:
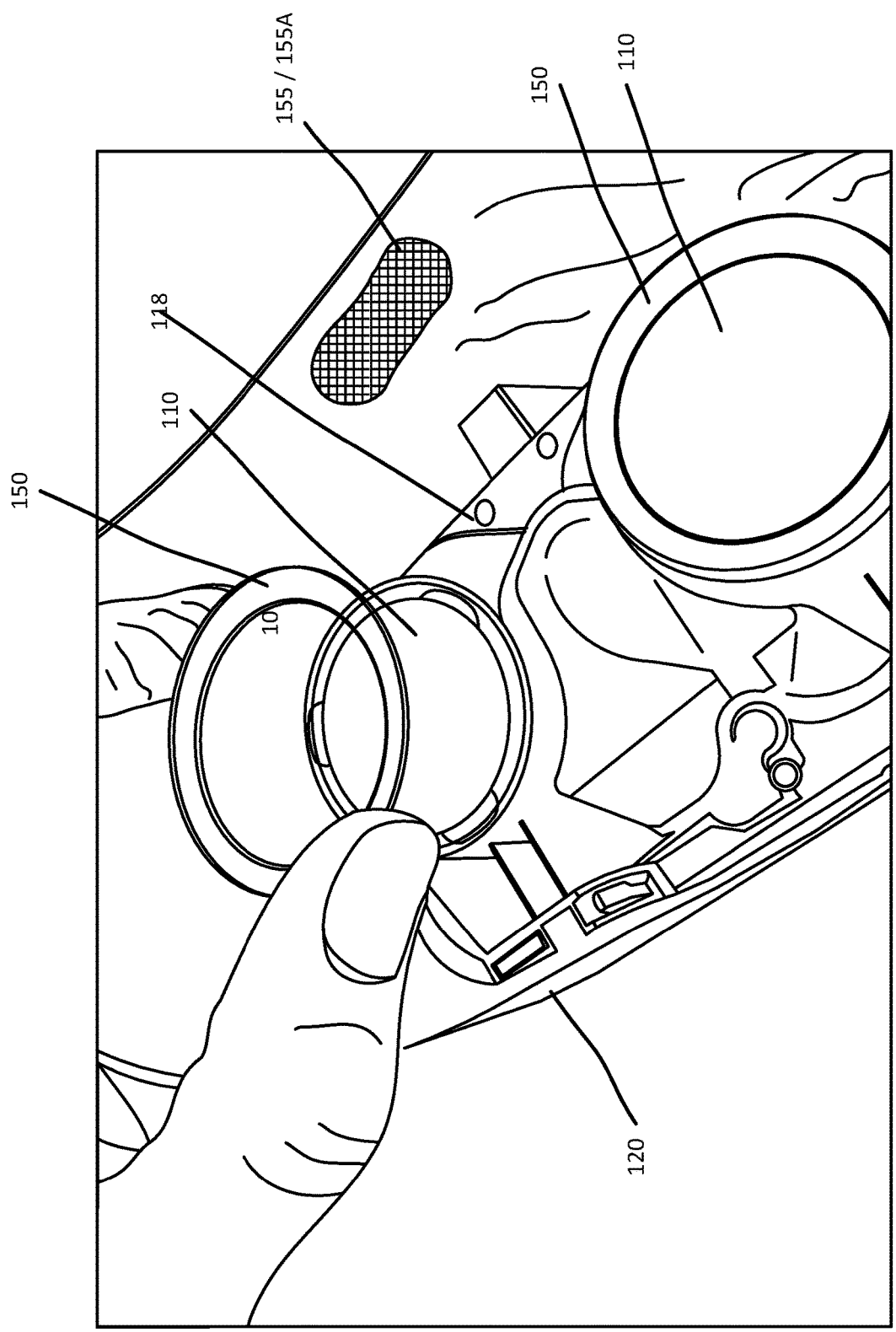
FIG. 5 illustrates a removable coupling of an example optical ring of an example augmented and/or virtual reality headset, in accordance with implementations described herein.

FIG. 5 illustrates the optical ring 150 being removably coupled to the headset 100. The optical ring 150 can be removably coupled to, for example, an optical structure 118 in the housing 120 that supports the various optical components, including, for example, the optical lenses 110, so that one or more of the optical components (e.g., a lens, a lens mechanism) of the headset 100 can be removed and/or replaced. In some implementations, the optical ring 150 can be coupled using a coupling mechanism such as a tab, a hook, and the like. In some implementations, the optical ring 150 can be rotatably removed.

Figure 6A:
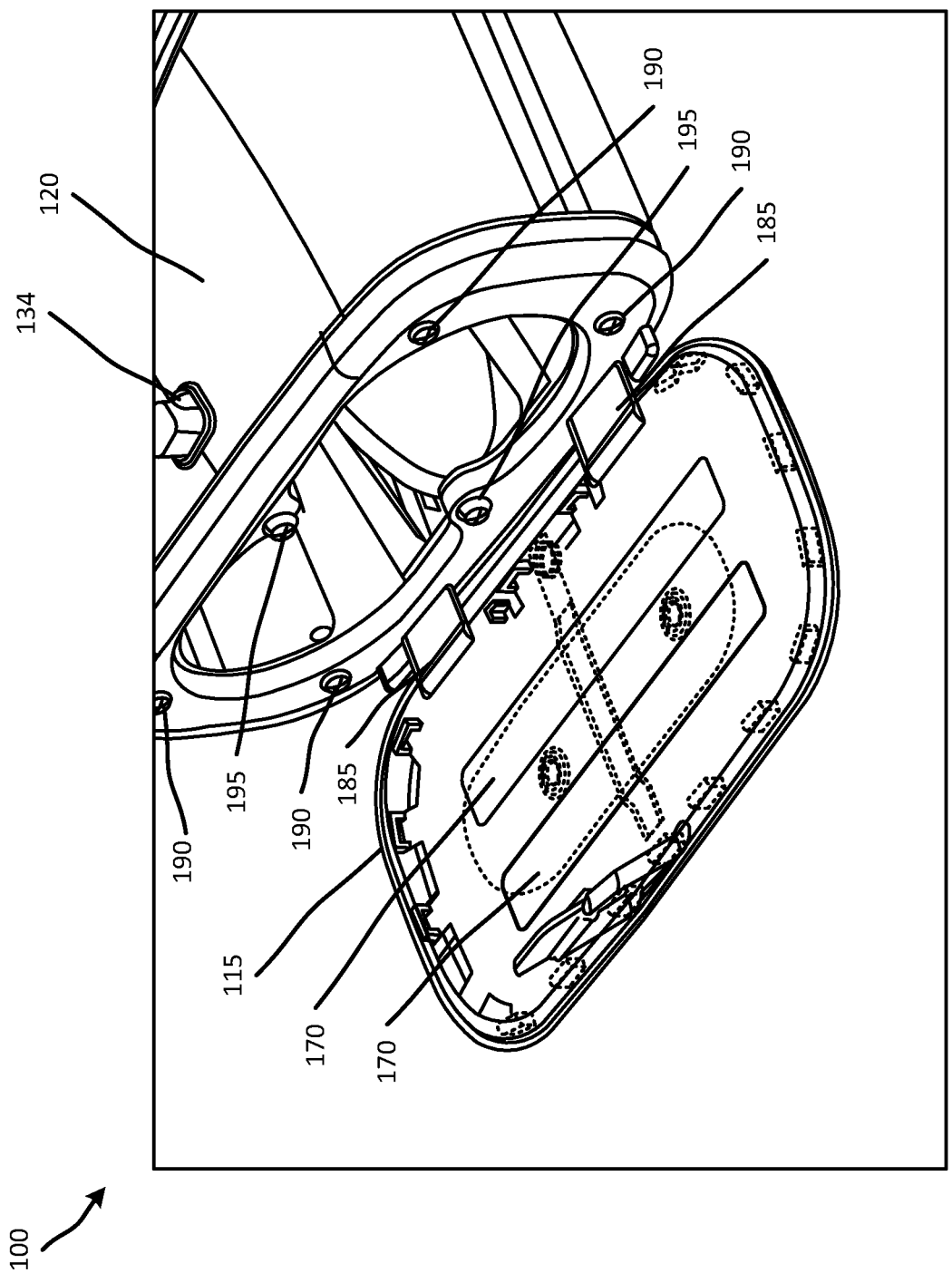
FIGS. 6A-6C illustrate placement of example electronic tags in an example augmented and/or virtual reality headset, in accordance with implementations described herein.
Figure 6B:
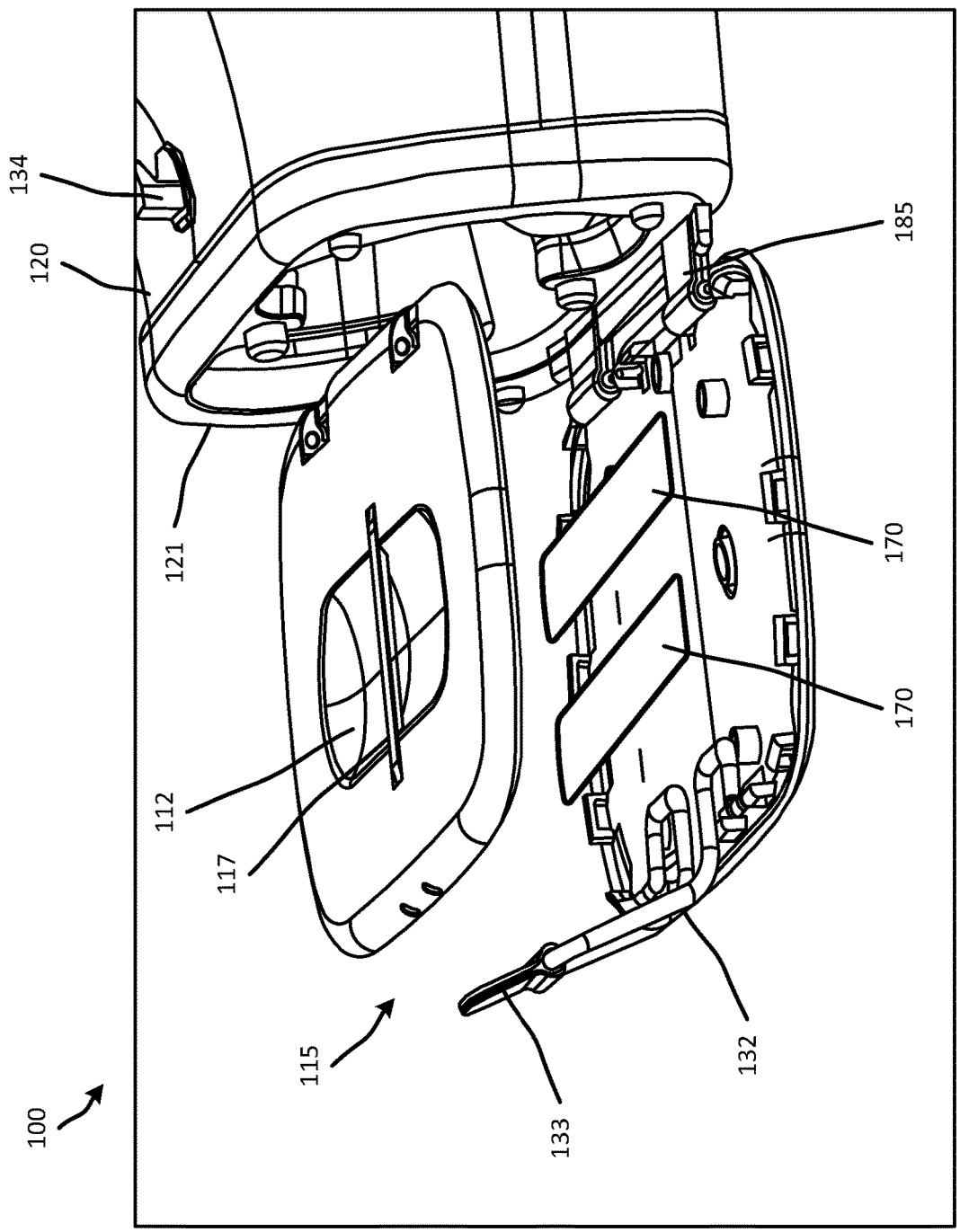
Figure 6C:
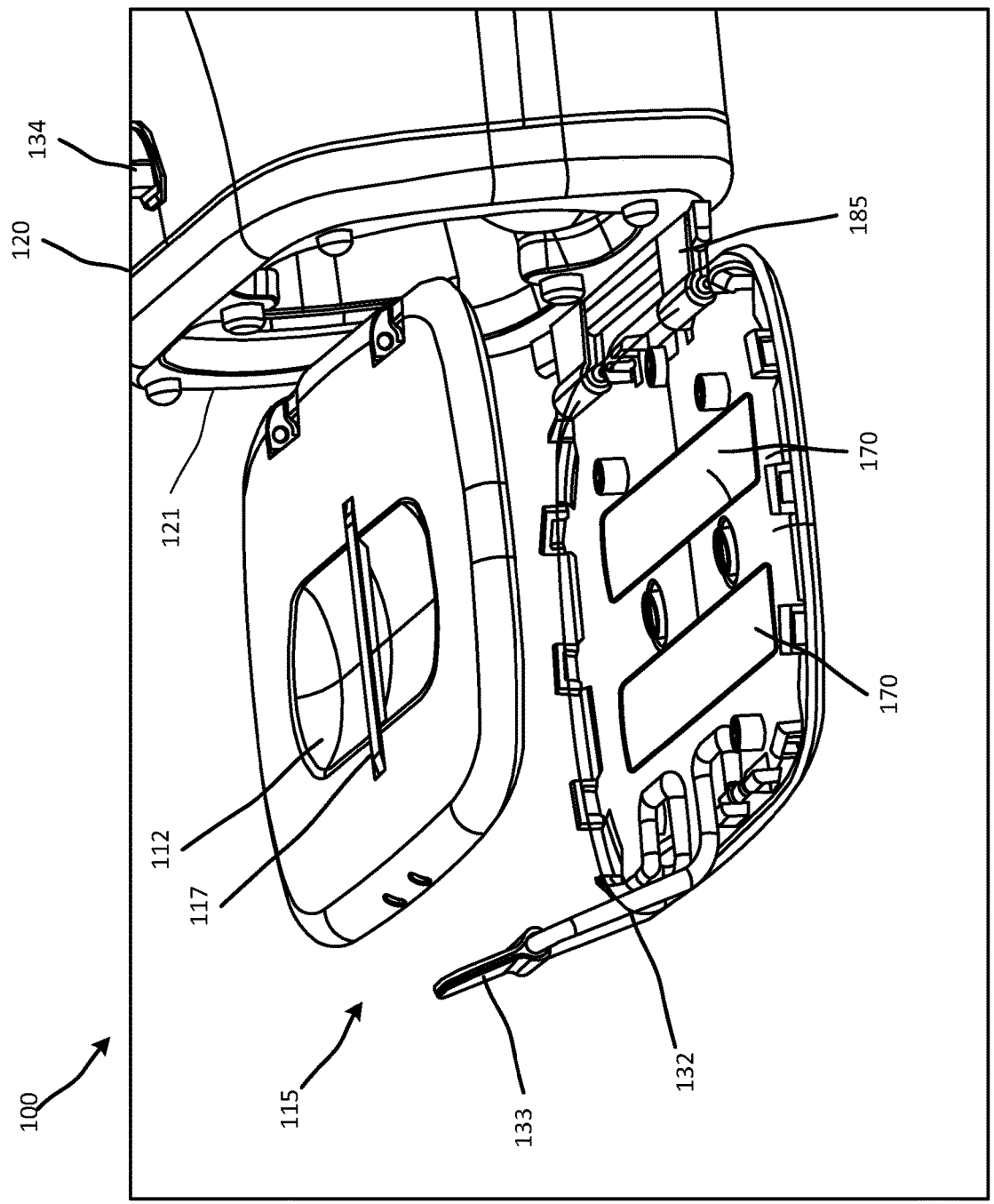

FIGS. 6A through 6C illustrate electronic tags 170 included in the front face 115 of the headset 100. In some implementations, the electronic tags 170 can be near field communication (NFC) tags. In some implementations, the electronic tags 170 can include multiple electronic tags 170 longitudinally aligned along the front face 115 of the headset 100. In some implementations, the electronic tags 170 may be NFC strips 170, each defined by a longitudinal length that is greater than a width thereof. For example, the electronic tags 170 can be longitudinally aligned so that the tags 170 can substantially be disposed across the entirety of (e.g., greater than 50% of the length of) the front face 115 of the headset 100. In some implementations, a gap between each end portion of the electronic tags 170 and the respective lateral end portion of the front face 115 may be less than approximately 20% of an overall length of the front face 115. In some implementations, the gap between each end portion of the electronic tags 170 and the respective lateral end portion of the front face 115 is less than approximately 15% of the overall length of the front face 115. In some implementations, the gap between each end portion of the electronic tags 170 and the respective lateral end portion of the front face 115 may be less than approximately 10% of the overall length of the front face 115. In some implementations, the electronic tags 170 may be arranged in parallel to each other. In some implementations, the electronic tags 170 may be aligned in the front face 115 of the headset 100 in a direction corresponding to the recess 112. In some implementations, one or more of the electronic tags 170 can be approximately 10 cm long. In some implementations, one or more of the electronic tags 170 can be greater than 10 cm long, depending on the overall length of the front face 115 of the headset 100. In some implementations, one or more of the electronic tags 170 can be less than 10 cm long, depending on the overall length of the front face 115 of the headset 100.

In the example implementation shown in FIGS. 6A-6C, two electronic tags 170 are included in the front face 115 of the headset 100. In some implementations, more than two electronic tags 170, or less than two electronic tags 170, can be included in the front face 115.

In some implementations, one of the electronic tags 170 can be configured so that when a computing device (e.g., a mobile device) is included in the headset 100 (for example, positioned in the slot 105 between the front face 115 and the housing 120) and the front face 115 is closed (e.g., the headset 100 is moved to the closed configuration), the tag electronic 170 can trigger the computing device to execute (e.g., launch) an application. In some implementations, the application can be a home screen application used for virtual reality content consumption. In some implementations, one or more of the electronic tags 170 can trigger execution of an application without unlocking the computing device before inserting the computing device into the headset 100.

In some implementations, one or more of the electronic tags 170 can be used to auto configure the headset 100 and/or a computing device included in the headset 100. In some implementations, one or more of the tags electronic 170 can be used to identify a characteristic of the headset 100. For example, one or more of the electronic tags 170 can be used to identify one or more optical parameters of the headset 100. In some implementations, one or more of the electronic tags 170 can be used by a computing device included in the headset 100 to identify one or more optical parameters of the headset 100. By identifying one or more characteristics of the headset 100, a computing device can be configured to produce a display that is compatible with the one or more characteristics of the headset 100. In other words, the device can be configured to adjust its performance (e.g., rendering software of the device) so that one or more images is displayed in a desirable fashion using the headset 100.

Sizing of the electronic tags 170, or elongated NFC strips 170, and arrangement of the electronic tags 170, or elongated NFC strips 170, for example, in the manner shown in FIGS. 6A-6C, may facilitate rapid connection/communication between the computing device received in the slot 105 and the optical components of the headset 100, and in particular, between an NFC chip in the computing device received in the slot 105 and the elongated NFC strips 170 in the front face 115 of the headset 100, without requiring or relying on precise positioning and/or orientation of the computing device in the slot 105. That is, the size and/or arrangement of the elongated NFC strips 170 in the front face 115 of the headset 100 may allow for rapid communication between the elongated NFC strips 170 of the headset 100 and the NFC chip of the computing device received in the slot 105, regardless of the location of the NFC chip in the computing device, and/or regardless of the position and/or orientation of the computing device in the slot 105. This may facilitate the rapid initiation of a virtual experience in the headset 100, and may enhance user convenience.

Because all of the features of FIGS. 1A through 7 are related to the same headset design, any of the features shown in any of the figures can be combined.

Figure 7:
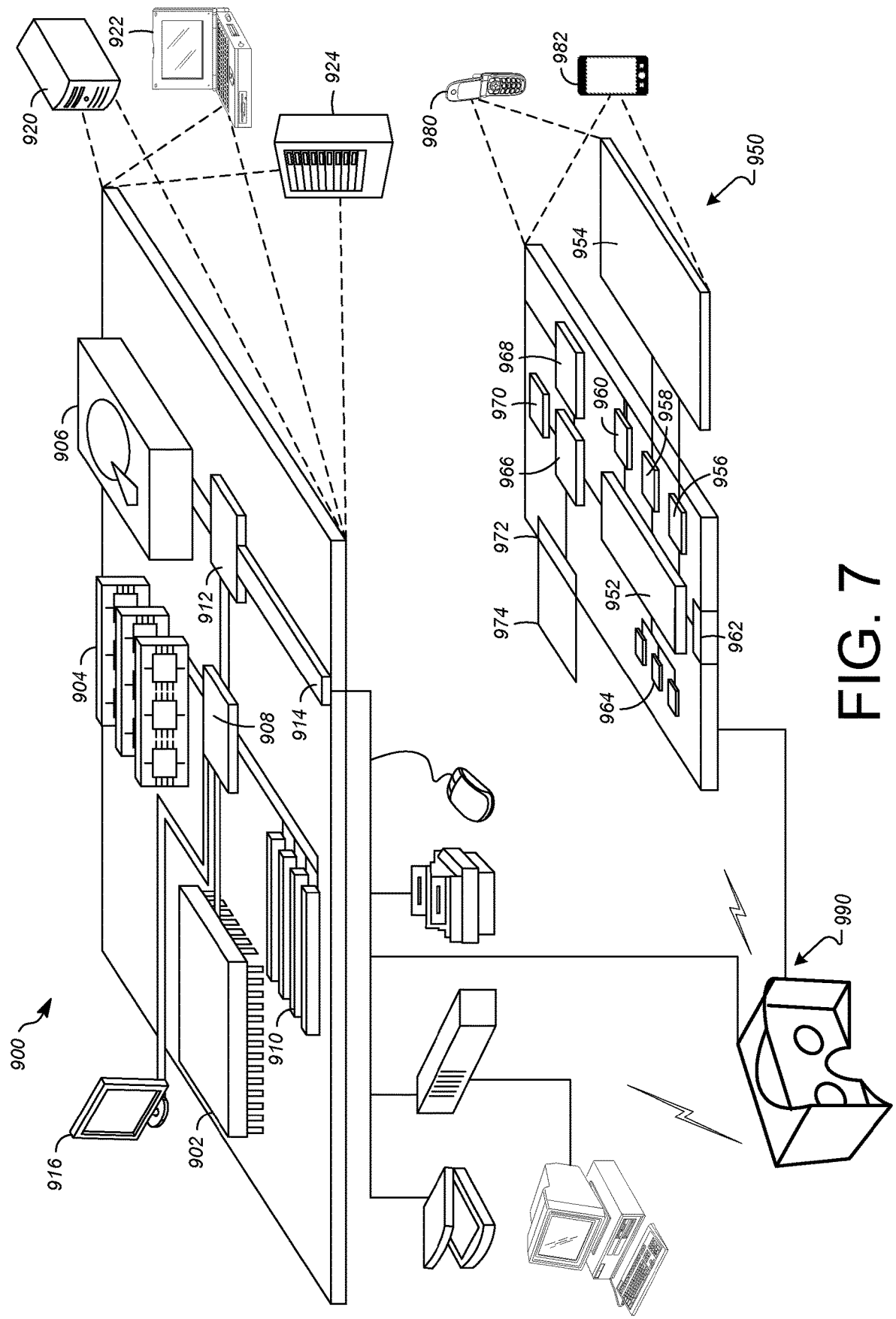
FIG. 7 illustrates an example of a computer device and a mobile computer device, which may be used with the example implementations described herein.

FIG. 7 shows an example of a computer device 900 and a mobile computer device 950, which may be used with the techniques described here. Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 9 can include sensors that interface with a virtual reality (VR headset/HMD device 990). For example, one or more sensors included on a computing device 950 or other computing device depicted in FIG. 9, can provide input to VR headset 990 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 950 can use the sensors to determine an absolute position and/or a detected rotation of the computing device in the VR space that can then be used as input to the VR space. For example, the computing device 950 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 950 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 950 when the computing device is incorporated into the VR space can cause a particular action to occur in the VR space.

In some implementations, a touchscreen of the computing device 950 can be rendered as a touchpad in VR space. A user can interact with the touchscreen of the computing device 950. The interactions are rendered, in VR headset 990 for example, as movements on the rendered touchpad in the VR space. The rendered movements can control virtual objects in the VR space.

In some implementations, one or more output devices included on the computing device 950 can provide output and/or feedback to a user of the VR headset 990 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, pie9oelectric devices, electrostatic devices, light emitting diodes (LEDs), strobes, and speakers.

In some implementations, the computing device 950 may appear as another object in a computer-generated, 3D environment. Interactions by the user with the computing device 950 (e.g., rotating, shaking, touching a touchscreen, swiping a finger across a touch screen) can be interpreted as interactions with the object in the VR space. In the example of the laser pointer in a VR space, the computing device 950 appears as a virtual laser pointer in the computer-generated, 3D environment. As the user manipulates the computing device 950, the user in the VR space sees movement of the laser pointer. The user receives feedback from interactions with the computing device 950 in the VR environment on the computing device 950 or on the VR headset 990.

In some implementations, a computing device 950 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 900 is intended to represent various forms of digital computers and devices, including, but not limited to laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A headset, comprising:
a housing defining an interior cavity;
optical components disposed in the interior cavity of the housing;
a front face rotatably coupled to a front portion of the housing;
a fastening device fastening the front face in a closed position relative to the housing;
a slot defined between the front portion of the housing and the front face in the closed position of the front face relative to the housing, the slot configured to receive a computing device including a display;
a plurality of near field communication (NFC) tags disposed in the front face, which include:
a first NFC tag arranged in the front face, wherein the first NFC strip is elongated such that the first NFC tag extends along a longitudinal direction in the front face, from a first lateral end portion of the front face to a second lateral end portion of the front face opposite the first lateral end portion thereof; and
a second NFC tag arranged in the front face, separated from and aligned parallel to the first NFC tag, wherein the second NFC strip is elongated such that the second NFC tag extends along the longitudinal direction in the front face such that the second NFC tag extends from the first lateral end portion to the second lateral end portion of the front face;
a face pad removably coupled to the housing; and
an adjustable head strap assembly coupled to the housing.

2. The headset of claim 1, wherein the adjustable head strap assembly includes:
a head strap, including:
a first portion having a first end thereof coupled to a first upper lateral side portion of the housing, and a second end thereof coupled to a first clip;
a second portion having a first end thereof coupled to a second upper lateral side portion of the housing, and a second end thereof coupled to a second clip; and
an overlap portion in which the first portion and the second portion of the head strap overlap.

3. The headset of claim 2, wherein
the first clip is fixedly coupled to the second end of the first portion of the head strap, and the second portion of the head strap is movably coupled to the first clip,
the second clip is fixedly coupled to the second end of the second portion of the head strap, and the first portion of the head strap is movably coupled to the second clip, and
the overlap portion is defined between the first clip and the second clip.

4. The headset of claim 2, wherein the head strap is made of a flexible, inelastic material.

5. The headset of claim 1, further comprising a coupling mechanism that removably couples the face pad to the housing, the coupling mechanism including a plurality of hook and loop fasteners selectively engaged between the face pad and the housing, including:
a first hook and loop fastener selectively engaging a top outer peripheral portion of the face pad with a corresponding top inner peripheral portion of the housing;
a second hook and loop fastener selectively engaging a first bottom outer peripheral portion face pad with a corresponding bottom inner peripheral portion of the housing; and
a third hook and loop fastener selectively engaging a second bottom outer peripheral portion face pad with a corresponding bottom inner peripheral portion of the housing.

6. The headset of claim 1, wherein the face pad includes:
a foam form defining a contour of the face pad; and
a fabric cover positioned on an outer surface of the foam form.

7. The headset of claim 6, wherein the face pad also includes:
a first opening corresponding to a first optical lens installed in the housing; and
a second opening corresponding to a second optical lens installed in the housing,
wherein a peripheral edge portion of the first opening is sealed, and a peripheral edge portion of the second opening is sealed.

8. The headset of claim 7, further comprising:
a first optical ring coupled to the first optical lens; and
a second optical ring coupled to the second optical lens,
wherein the sealed peripheral edge portion of the first opening of the face pad is coupled in a recess defined by the first optical ring, and the sealed peripheral edge portion of the second opening of the face pad is coupled in a recess defined by the second optical ring, when the face pad is coupled to the housing.

9. The headset of claim 1, wherein the housing includes an opening in a front surface thereof, the opening being in communication with the cavity defined in the interior of the housing, the headset further comprising a plurality of support pads provided on the front surface of the housing, arranged along a periphery of the opening, the plurality of support pads being made of a silicone material.

10. The headset of claim 1, wherein the housing includes an opening in a front surface thereof, the opening being in communication with the cavity defined in the interior of the housing, the headset further comprising a plurality of electronic pads provided on the front surface of the housing, including:
a first electronic pad positioned at a top central portion of a periphery of the opening; and
a second electronic pad positioned at a bottom central portion of the periphery of the opening.

11. The headset of claim 10, wherein the first and second electronic pads are configured to contact the display of the computing device received in the slot, and to index the display so as to define a first portion of the display and a second portion of the display.

12. The headset of claim 1, further comprising:
a recess formed in an inner surface of the front face; and
a coupling device configured to couple a controller in the recess.

13. The headset of claim 1, wherein
a gap between each end portion of the first NFC tag and the respective lateral end portion of the front face is less than approximately 15% of an overall length of the front face, and
a gap between each end portion of the second NFC tag and the respective lateral end portion of the front face is less than approximately 15% of the overall length of the front face.

14. The headset of claim 1, further comprising a hinge mechanism rotatably coupling a peripheral edge portion of the housing and a corresponding peripheral edge portion of the front face, the hinge mechanism including a spring loaded rod configured to adjust a width of the slot defined between the housing and the front face based on a thickness of the computing device received in the slot.

15. The headset of claim 1, wherein the fastening device includes:
 a strap having a proximal end portion coupled to a peripheral edge portion of the front face;
 a tab coupled to a distal end portion of the strap; and
 a protrusion provided on an outer surface of the housing, wherein the tab is configured to engage the protrusion so as to fasten the front face in a closed position relative to the housing.

16. The headset of claim 1, wherein the plurality of NFC tags disposed in the front face is configured to communicate with at least one NFC tag of the computing device disposed in the slot, to trigger the computing device to execute an application, to identify a characteristic of the headset, to configure the headset, or to facilitate communication between the computing device and the optical components of the headset.

17. A headset, comprising:
 a housing defining an interior cavity;
 an optical component disposed in the interior cavity of the housing;
 a front face rotatably coupled to a front portion of the housing;
 a fastening device fastening the front face in a closed position relative to the housing;
 a slot defined between the front portion of the housing and the front face in the closed position of the front face relative to the housing, the slot configured to receive a computing device including a display; and
 a plurality of near field communication (NFC) tags installed in the front face, which include:
  a first NFC tag arranged longitudinally in the front face, wherein the first NFC tag is elongated in a longitudinal direction of the front face, such that the first NFC tag extends in the longitudinal direction of the front face, from a first lateral end portion of the front face to a second lateral end portion of the front face opposite the first lateral end portion thereof; and
  a second NFC tag arranged longitudinally in the front face, separated from and aligned parallel to the first NFC tag, wherein the second NFC strip is elongated in the longitudinal direction of the front face, such that the second NFC tag extends from the first lateral end portion to the second lateral end portion of the front face.

18. The headset of claim 17, wherein the plurality of NFC tags are configured to identify the computing device disposed in the slot, and to enable communication between the computing device and the optical component in response to the identification of the computing device.

* * * * *

UNITED STATES PATENT AND TRADEMARK OFFICE
CERTIFICATE OF CORRECTION

PATENT NO. : 10,890,941 B2
APPLICATION NO. : 15/720026
DATED : January 12, 2021
INVENTOR(S) : Raffle et al.

Page 1 of 1

It is certified that error appears in the above-identified patent and that said Letters Patent is hereby corrected as shown below:

In the Claims

In Column 15, Claim 1, Line 23, delete "strip" and insert -- tag --, therefor.

In Column 15, Claim 1, Line 30, delete "strip" and insert -- tag --, therefor.

In Column 18, Claim 17, Line 18, delete "strip" and insert -- tag --, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*